US012494147B2

(12) United States Patent
Zhou et al.

(10) Patent No.: US 12,494,147 B2
(45) **Date of Patent: *Dec. 9, 2025**

(54) DISPLAY DEVICE AND METHOD FOR DRIVING DISPLAY PANEL

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Xingyao Zhou, Wuhan (CN); Yana Gao, Wuhan (CN); Kang Yang, Wuhan (CN); Wei Liu, Wuhan (CN); Qijun Yao, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,157

(22) Filed: Apr. 23, 2024

(65) Prior Publication Data

US 2024/0274052 A1 Aug. 15, 2024

Related U.S. Application Data

(63) Continuation of application No. 18/306,464, filed on Apr. 25, 2023, now Pat. No. 11,996,027.

(30) Foreign Application Priority Data

Aug. 24, 2022 (CN) ......................... 202211021909.6

(51) Int. Cl.
*G09G 3/3258* (2016.01)
*G09G 3/20* (2006.01)
*G09G 3/3233* (2016.01)

(52) U.S. Cl.
CPC ............. *G09G 3/20* (2013.01); *G09G 3/3233* (2013.01); *G09G 2300/0842* (2013.01);
(Continued)

(58) Field of Classification Search
CPC ................... G09G 3/20; G09G 3/3233; G09G 2300/0842; G09G 2310/0202;
(Continued)

(56) References Cited

U.S. PATENT DOCUMENTS

2018/0130410 A1* 5/2018 Gao ..................... G09G 3/3225
2018/0151123 A1* 5/2018 Li ........................ G09G 3/3233
(Continued)

FOREIGN PATENT DOCUMENTS

CN 114120900 A 3/2022
CN 114187872 A 3/2022
(Continued)

OTHER PUBLICATIONS

Office Action mailed Jun. 24, 2024, issued in corresponding Chinese Application No. 202211021909.6 filed Aug. 24, 2022, 14 pages.

*Primary Examiner* — Abdul-Samad A Adediran
(74) *Attorney, Agent, or Firm* — CHRISTENSEN O'CONNOR JOHNSON KINDNESS PLLC

(57) ABSTRACT

A display device including a display panel having a display area. The display panel includes pixel circuits located in the display area. Each pixel circuit includes a driving transistor and a voltage regulating module that is configured to adjust a node voltage of the driving transistor by a voltage provided by one voltage regulating signal line of voltage regulating signal lines. The pixel circuits have data refresh frequencies including first and second frequencies. The first frequency is greater than the second frequency. When one pixel circuit performs data refreshing at the first frequency, one voltage regulating signal line is configured to provide a first voltage,
(Continued)

and when one pixel circuit performs data refreshing at the second frequency, one voltage regulating signal line is configured to provide a second voltage not equal to the first voltage.

20 Claims, 17 Drawing Sheets

(52) U.S. Cl.
CPC . *G09G 2310/0202* (2013.01); *G09G 2310/08* (2013.01); *G09G 2320/0233* (2013.01); *G09G 2320/0247* (2013.01); *G09G 2330/021* (2013.01); *G09G 2340/00* (2013.01)

(58) Field of Classification Search
CPC ....... G09G 2310/08; G09G 2320/0233; G09G 2320/0247; G09G 2330/021; G09G 2340/00; G09G 3/3225
See application file for complete search history.

(56) References Cited

U.S. PATENT DOCUMENTS

| | | | | |
|---|---|---|---|---|
| 2018/0166025 | A1* | 6/2018 | Zhou | G09G 3/3233 |
| 2020/0074928 | A1* | 3/2020 | Li | G09G 3/3233 |

FOREIGN PATENT DOCUMENTS

| | | | |
|---|---|---|---|
| CN | 114283691 | A | 4/2022 |
| CN | 114758615 | A | 7/2022 |
| CN | 114842805 | A | 8/2022 |

* cited by examiner

DISPLAY DEVICE AND METHOD FOR DRIVING DISPLAY PANEL

CROSS-REFERENCE TO RELATED APPLICATIONS

The present disclosure is a continuation application to U.S. application Ser. No. 18/306,464, filed Apr. 25, 2023, which claims priority to Chinese Patent Application No. 202211021909.6, filed on Aug. 24, 2022, the content of which is incorporated herein by reference in its entirety.

TECHNICAL FIELD

The present disclosure relates to the field of display technologies, and particularly, to a display device and a method for driving a display panel.

BACKGROUND

With continuous development of science and technology, the driving modes of the display panel are also becoming more and more diverse, for example, when the display panel displays an image, the pixel circuits can perform data refreshing at different data refresh frequencies.

However, with different data refresh frequencies, the light-emitting elements have different light-emitting brightness, which easily leads to defects of the display panel, such as screen flicker or an uneven display.

SUMMARY

In an aspect, some embodiments of the present disclosure provide a display device. The display device includes a display panel having a display area. The display panel includes pixel circuits arranged in the display area. Each of the pixel circuits includes a driving transistor and a voltage regulating module. The voltage regulating module is configured to adjust a node voltage of the driving transistor by a voltage provided by one voltage regulating signal line of voltage regulating signal lines. The pixel circuits have data refresh frequencies, which include a first frequency and a second frequency. The first frequency is greater than the second frequency. When one pixel circuit of the pixel circuits performs data refreshing at the first frequency, one of the voltage regulating signal lines is configured to provide a first voltage, and when one pixel circuit of the pixel circuits performs data refreshing at the second frequency, one of the voltage regulating signal lines is configured to provide a second voltage not equal to the first voltage.

In another aspect, some embodiments of the present disclosure provide a method for driving a display device. The display panel has a display area and includes pixel circuits arranged in the display area. Each of the pixel circuits includes a driving transistor and a voltage regulating module. The voltage regulating module is configured to adjust a node voltage of the driving transistor by a voltage provided by one voltage regulating signal line of voltage regulating signal lines. The pixel circuits have data refresh frequencies, which include a first frequency and a second frequency. The first frequency is greater than the second frequency. The method for driving the display panel includes: when controlling one pixel circuit of the pixel circuits to perform data refreshing at the first frequency, controlling one of the voltage regulating signal lines to provide a first voltage; and when controlling one pixel circuit of the pixel circuits to perform data refreshing at the second frequency, controlling one of the voltage regulating signal lines to provide a second voltage, the first voltage being not equal to the second voltage.

BRIEF DESCRIPTION OF DRAWINGS

In order to more clearly illustrate technical solutions of embodiments of the present disclosure, accompanying drawings used in the embodiments are briefly described below. The drawings described below illustrate merely some of the embodiments of the present disclosure. Based on these drawings, those skilled in the art can obtain other drawings.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art shall fall into the protection scope of the present disclosure.

The terms used in the embodiments of the present disclosure are merely for the purpose of describing specific embodiments, rather than limiting the present disclosure. The terms “a”, “an”, “the” and “said” in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there can be three relations, e.g., A and/or B can indicate A alone, A and B, and B alone. In addition, the symbol "/" in the context generally indicates that the relation between the objects before and after the "/" is an "or" relation.

It can be understood that a driving frequency of a display panel is a data refreshing frequency of a pixel circuit in the display panel, which refers to a frequency at which the pixel circuit writes a data voltage, that is, a charging frequency of a driving transistor in the pixel circuit.

Figure 1:
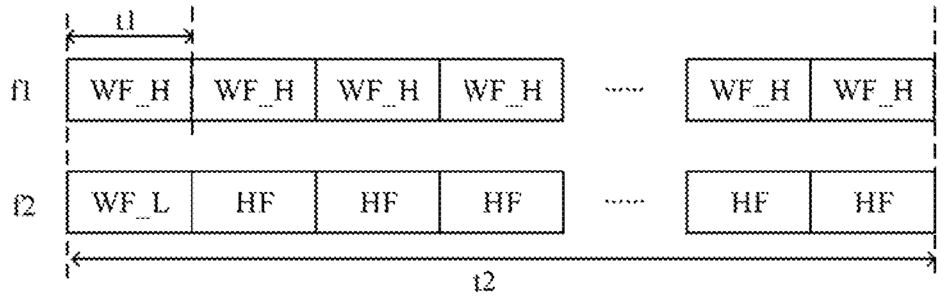
FIG. 1 is a schematic diagram of an operation duration during which a pixel circuit performs data refreshing at a first frequency and a second frequency according to some embodiments of the present disclosure.

FIG. 1 is a schematic diagram of an operation duration during which a pixel circuit performs data refreshing at a first frequency and a second frequency according to some embodiments of the present disclosure. As shown in FIG. 1, when the display panel is driven at a high frequency of a first frequency f1, a data refresh cycle of the pixel circuit is t1, where $$t1 = \frac{1}{f1} s.$$

The embodiments of the present disclosure define the data refresh cycle t1 as a high-frequency writing period WF_H. During the high-frequency writing period WF_H, the pixel circuit sequentially performs at least a reset operation, a charging operation, and a light-emitting operation.

When the display panel is driven at a low frequency of a second frequency f2, the data refresh cycle of the pixel circuit is t2, where $$t2 = \frac{1}{f2} s$$

and t2>t1. The data refresh cycle t2 includes a low-frequency writing period WF_L and multiple holding periods HF. During the low-frequency writing period WF_L, the pixel circuit sequentially performs at least a reset operation, a charging operation, and a light-emitting operation. During the holding period HF, the pixel circuit no longer performs reset operation and charging operation. The holding period HF still use a data voltage written during the low-frequency writing period WF_L to achieve light emitting.

Taking f1=120 Hz and f2=1 Hz as an example, under the high-frequency driving mode, $$t1 = \frac{1}{120} s,$$

that is, the high-frequency writing period WF_H lasts 1/120 s; and under the low-frequency driving mode, t2=1 s, the data refresh cycle t2 of the pixel circuit includes one low-frequency writing period WF_L and 119 holding periods HF, and the low-frequency writing period WF_L and a single holding period HF each last 1/120 s.

Since a difference between the holding period HF and each of the low-frequency writing period WF_L and the high-frequency writing period WF_H lies in whether the data voltage is written to the driving transistor, a bias state of the driving transistor during the holding period HF is different from the bias state of the driving transistor during each of the low-frequency writing period WF_L and the high-frequency writing period WF_H, so that the light-emitting brightness of the light-emitting element during the holding period HF is higher than the light-emitting brightness of the light-emitting element during each of the low-frequency writing period WF_L and the high-frequency writing period WF_H.

In one embodiment, if the display panel switches from the low-frequency driving mode to the high-frequency driving mode when displaying images, then, when the display panel enters the high-frequency writing period WF_H of the high-frequency driving mode from the holding period HF of the low-frequency driving mode, obvious flicker phenomenon will occur in the display panel, which will affect display effect of the display panel.

In another embodiment, if the display panel 100 controls different sub-areas at different frequencies, for example, when the display panel displays an image, one sub-area of the display area is driven at a low frequency, and another sub-area of the display area is driven at a high frequency, and then a large difference in the brightness of different sub-areas is generated due to that the brightness during the holding period HF in the low-frequency driving mode is higher than the brightness during the high-frequency writing period WF_H in the high-frequency driving mode and the low frequency driving process includes multiple holding periods HF, which will lead to the problem of uneven display.

Figure 2:
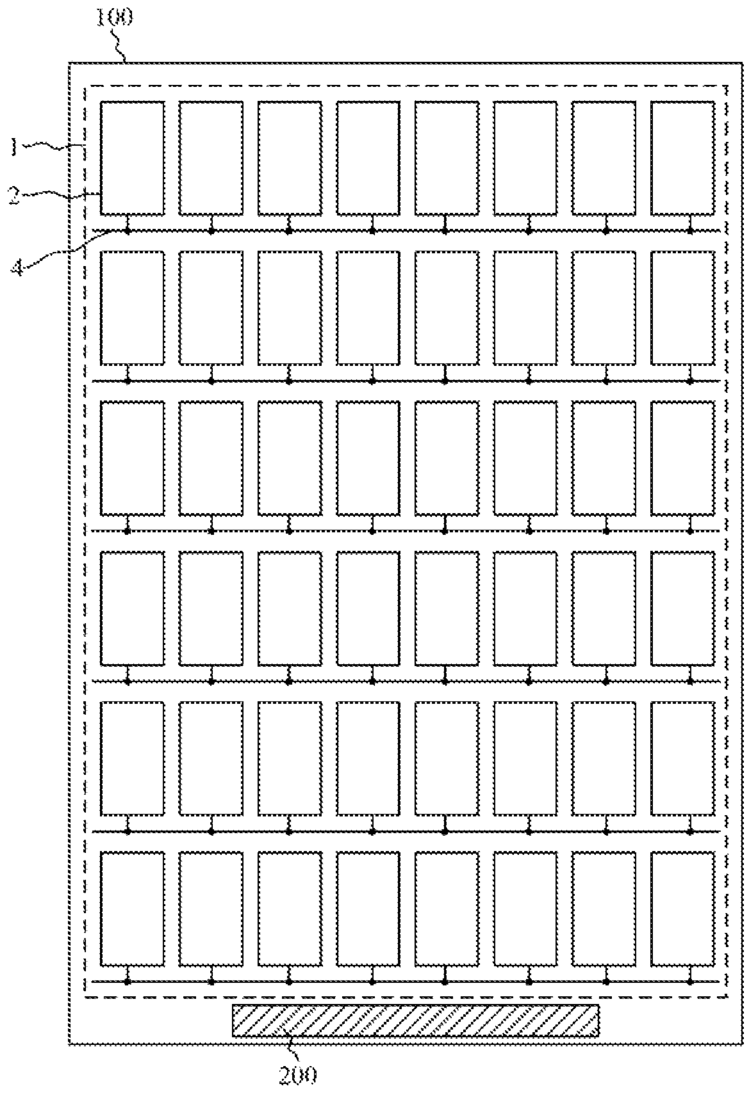
FIG. 2 is a top view of a display device according to some embodiments of the present disclosure.
Figure 3:
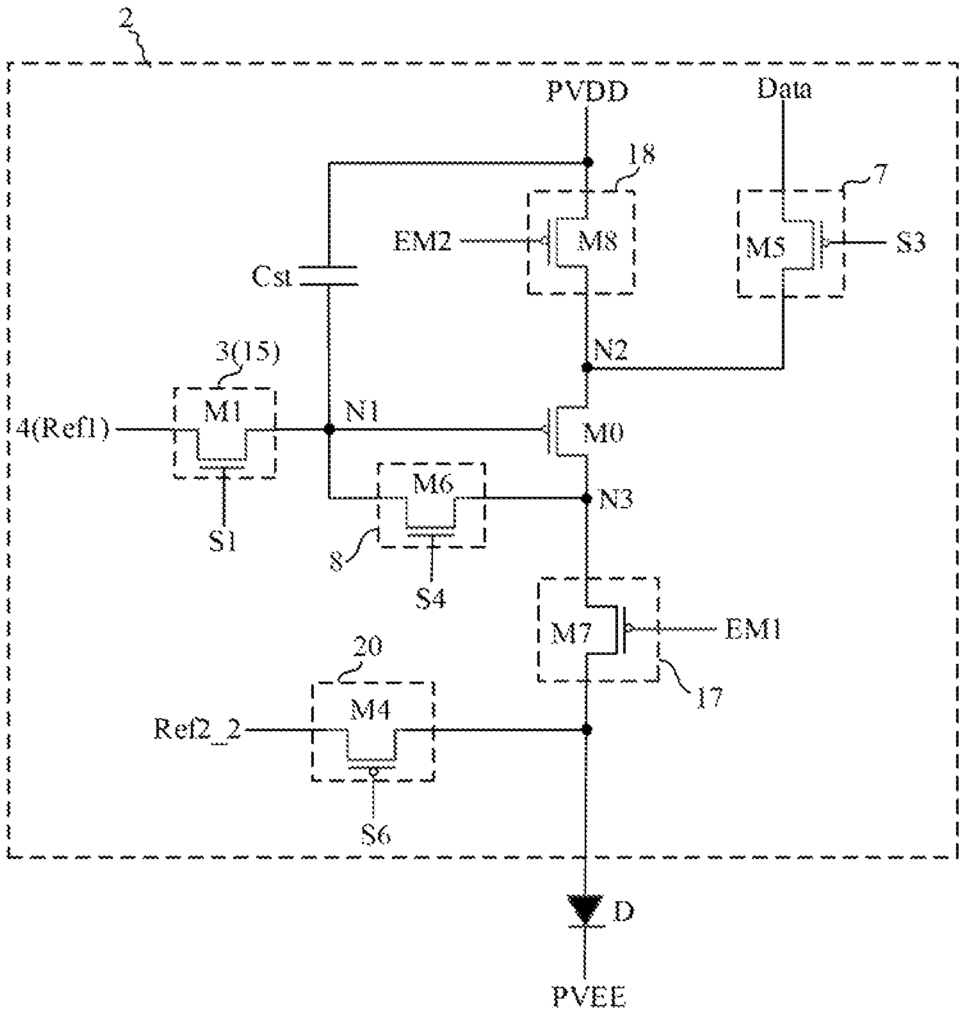
FIG. 3 is a schematic diagram of a pixel circuit according to some embodiments of the present disclosure.

In this regard, some embodiments of the present disclosure provide a display device. FIG. 2 is a top view of a display device according to some embodiments of the present disclosure, and FIG. 3 is a schematic diagram of a pixel circuit 2 according to some embodiments of the present disclosure. As shown in FIG. 2 and FIG. 3, the display device includes a display panel 100 having a display area 1, and the display panel includes multiple pixel circuits 2 provided in the display area 1. The pixel circuit 2 includes a driving transistor M0 and a voltage regulating module 3, and the voltage regulating module 3 is configured to adjust a node voltage of the driving transistor M0 by a voltage provided by a voltage regulating signal line 4.

In the pixel circuit 2, a gate of the driving transistor M0 is electrically connected to a first node N1, a first electrode of the driving transistor M0 is electrically connected to a second node N2, and a second electrode driving transistor M0 is electrically connected to a third node N3. The node voltages of the driving transistor M0 include a voltage for driving the gate of the driving transistor M0 (a voltage of the first node N1), a voltage for driving the first electrode of the driving transistor M0 (a voltage of the second node N2), and/or a voltage for driving the second electrode of the driving transistor M0 (a voltage of the third node N3).

The data refresh frequencies of the pixel circuit 2 includes a first frequency and a second frequency, and the first frequency is greater than the second frequency. When the pixel circuit 2 performs data refreshing at the first frequency, the voltage regulating signal line 4 provides the first voltage, and when the pixel circuit 2 performs data refreshing at the second frequency, the voltage regulating signal line 4 provides a second voltage not equal to the first voltage.

Based on the technical solutions provided in the embodiments of the present disclosure, when the display panel 100 operates at different driving frequencies, by providing different voltages provided by at least one voltage regulating signal line 4, the node voltage of the driving transistor M0 can be adjusted within specific periods corresponding to different driving frequencies, so that the driving transistor M0 is in a specific bias state. For example, by adjusting the first voltage or the second voltage, the bias state of the driving transistor M0 during the high-frequency writing period WF_H under the high-frequency driving mode can be adjusted to increase a driving current converted by the driving transistor M0, or the bias state of the driving transistor M0 during the holding period HF under the low-frequency driving mode can be adjusted to reduce the driving current converted by the driving transistor M0, thereby reducing the difference in the light-emitting brightness of the light-emitting element D during the high-frequency writing period WF_H and the holding period HF.

In view of the above, it is realized that, when the display panel 100 displays images, when the display panel is switched from the low-frequency driving mode to the high-frequency driving mode, the screen flicker phenomenon generated when the display panel enters the high-frequency writing period WF_H in the high-frequency driving mode from the holding period HF in the low-frequency driving mode, can be weakened. In other embodiments, when the display panel 100 controls different sub-areas at different frequencies, the brightness difference between different sub-areas can be effectively weakened, thereby improving the uniformity of display. Such technical solutions are more suitable for the medium-large-sized display products having a split screen display function.

In one driving mode, the display panel 100 can have a variety of display modes. For example, when the display panel 100 displays dynamic images, such as a video or a game, the display panel 100 can be in a high-frequency driven display mode, so as to control the pixel circuit 2 to perform data refreshing at a higher frequency to improve the fluency of displaying images; and when the display panel 100 is in a standby state or only displays text and the like, the display panel 100 can be in a low-frequency driven display mode, so as to control the pixel circuit 2 to perform data refreshing at a lower frequency to save power consumption.

In some embodiments, the display panel 100 has a first mode and a second mode. The first mode can correspond to the high-frequency display driven mode, and the second mode can correspond to the low-frequency driven display mode.

Referring to FIG. 2 again, the display device can include a first driving module 200, the first driving module 200 can be a processor in a driver chip. The first driving module 200 is configured to: in the first mode, control the pixel circuits 2 in the display area 1 to perform data refreshing at the first frequency, and control at least one voltage regulating signal line 4 electrically connected to the pixel circuits 2 located in the display area 1 to provide the first voltage; and in the second mode, control the pixel circuits 2 in the display area 1 to perform data refreshing at the second frequency, and control at least one voltage regulating signal line 4 electrically connected to the pixel circuits 2 located in the display area 1 to provide a second voltage.

When all pixel circuits 2 in the display area 1 are configured to control the light-emitting elements D to emit light, in the first mode, the first driving module 200 can control all pixel circuits in the display area 1 to perform data refreshing at the first frequency, and can control at least one voltage regulating signal line 4 electrically connected to all pixel circuits 2 to provide the first voltage; and in the second mode, the first driving module 200 can control all pixel circuits in the display area 1 to perform data refreshing at the second frequency, and can control the at least one voltage regulating signal line 4 electrically connected to all pixel circuits 2 to provide the second voltage.

When the display panel 100 has different display modes, embodiments of the present disclosure provide different voltages by the voltage regulating signal lines 4 in different display modes, the bias state of the driving transistor M0 in a particular period in different display modes can be adjusted in different degrees, thereby regulating the value of the driving current that can be converted by the driving transistor M0 in different display modes. For example, the driving current converted by the driving transistor M0 can be increased in the first mode to weaken the difference between the light-emitting brightness of the light-emitting element D during the high-frequency writing period WF_H and the light-emitting brightness of the light-emitting element D during the holding period HF. In this way, when display panel 100 switches from the second mode to the first mode, the flicker phenomenon generated by switching images (jumping from the holding period HF to the high-frequency writing period WF_H) can be improved, which optimizes the display effect.

In another driving mode, when the display panel 100 displays an image, different positions of the display area 1 can be configured to display different content. In this case, the display panel 100 drives different sub-areas at different frequencies, for example, a portion of the display area 1 for displaying video, games and other content, in order to improve the fluency of displaying images, this portion of the display area can be driven at a high frequency, and the pixel circuit 2 within this portion of the display area 2 performs data refreshing at a higher frequency, such as 360 Hz, 240 Hz, or 120 Hz. Another portion of the display area is configured to display keyboard, time, and other content, and due to a low demand for display effect of this type of image, in order to reduce power consumption, the another portion of the display area can be driven at a low frequency, and the pixel circuit 2 in the another portion of the display area performs data refreshing at a lower frequency, such as 30 Hz, 10 Hz, or 1 Hz.

Figure 4:
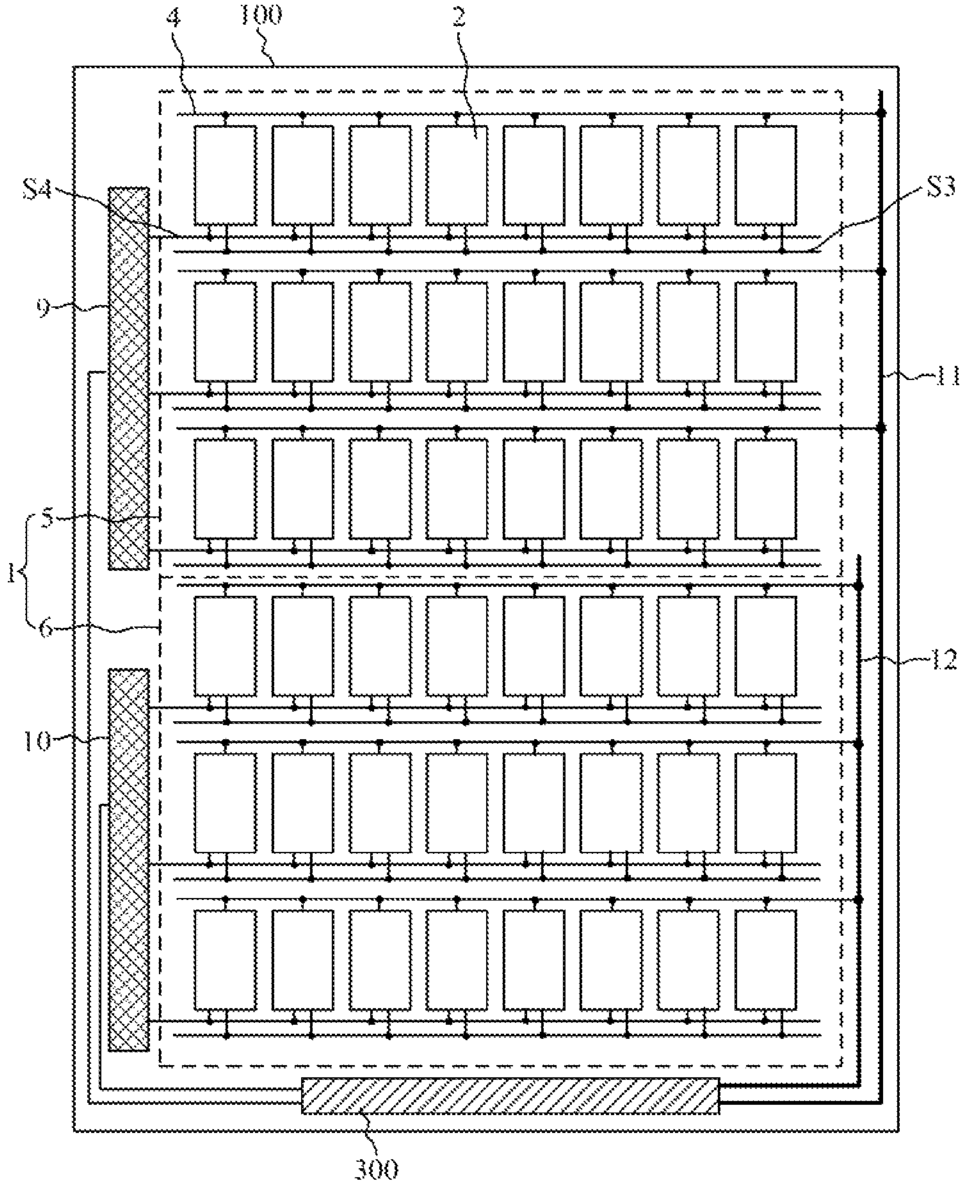
FIG. 4 is another top view of a display device according to some embodiments of the present disclosure.

FIG. 4 is another top view of a display device according to some embodiments of the present disclosure. In view of the above, in some embodiments, as shown in FIG. 4, the display device includes a second driving module 300, and the second driving module 300 can be a processor in the driver chip.

The second driving module 300 is configured to: when the display panel 100 displays an image, control the pixel circuit 2 in a first sub-area 5 of the display area 1 to perform data refreshing at the first frequency, control the voltage regulating signal line 4 electrically connected to the pixel circuit 2 located in the first sub-area 5 to provide the first voltage, control the pixel circuit 2 in a second sub-area 6 of the control display area 1 to perform data refreshing at the second frequency, and control the voltage regulating signal line 4 electrically connected to the pixel circuit 2 located in the second sub-area 6 to provide the second voltage.

The first sub-area 5 corresponds to an area of the display area 1 that is driven at a high frequency, and the second sub-area 6 corresponds to another area of the display area 1 that is driven at a low frequency.

Taking the first frequency of 120 Hz and the second frequency of 1 Hz as an example, the data refresh cycle t1 of a first pixel circuit 2 lasts 1/120 s, and the data refresh cycle t2 of the second pixel circuit 2 lasts 1 s. Within Is, the pixel circuit 2 in the first sub-area 5 performs data refreshing 120 times, which corresponds to 120 high-frequency writing periods WF_H; and the pixel circuit 2 in the second sub-area 6 performs data refreshing only once, that is, corresponding to one low-frequency writing period WF_L and 119 holding period HF. If there is a significant difference between the brightness during the holding period HF and the brightness during the high-frequency writing period WF_H, within a certain period, for example, within Is, the overall display brightness in the second sub-area 6 will be significantly higher than the overall display brightness in the first sub-area 5, and then the split screen phenomenon will occur.

The embodiments of the present disclosure provide different voltages provided by the voltage regulating signal lines 4 electrically connected to the pixel circuits 2 in both the first sub-area 5 and the second sub-area 6, the bias states of the driving transistors M0 in both the first sub-area 5 and the second sub-area 6 within a period are adjusted to different degrees, and then values of the driving currents that can be converted by the driving transistors M0 in both the first sub-area 5 and the second sub-area 6 can be adjusted. For example, the driving current converted by the transistor M0 in the first sub-area 5 can be increased to weaken the difference between the light-emitting brightness of the light-emitting element D during the high-frequency writing period WF_H corresponding to the first sub-area 5 and the light-emitting brightness of the light-emitting element D during the holding period HF corresponding to the second sub-area 6, and then the overall display brightness difference between the first sub-area 5 and the second sub-area 6 can be significantly weakened during the display process, which improves the display uniformity of the display panel 100, and improving the split screen phenomenon.

When the display panel 100 drives different sub-areas at different frequencies, in some embodiments, with reference to FIG. 4 again, the display panel 100 displays different images, a position of the first sub-area 5 and a position of the second sub-area 6 are fixed, that is, regardless of what image the display panel 100 displays, the position of the first sub-area 5 and the position of the second sub-area 6 do not change, the first sub-area 5 is always driven at a high frequency, and the second sub-area 6 is always driven at a low frequency.

Such configuration is more suitable for a display device having a local area for displaying a specific image, for example, in the medium-large-sized display device, a top corner of the display device always displays time information such as a clock, so that the local area at the top corner can be set as the second sub-area 6, other area can be set as the first sub-area 5. In this case, the second driving module 300 can only, according to the fixed position information of the first sub-area 5 and the second sub-area 6, control the refresh frequency of the pixel circuit 2 in the first sub-area 5 and the refresh frequency of the pixel circuit 2 in the second sub-area 6 to be different from each other, and control the voltage provided by the voltage regulating signal line 4 electrically connected to the pixel circuit 2 in the first sub-area 5 and the voltage provided by the voltage regulating signal line 4 electrically connected to the pixel circuit 2 in the second sub-area 6 to be different from each other.

In some embodiments, referring to FIG. 3, the pixel circuit 2 can include a data writing module 7 and a threshold compensation module 8, the data writing module 7 is electrically connected to a third scanning signal line S3, a data line Data, and the first electrode of the driving transistor M0, and the threshold compensation module 8 is electrically connected to a fourth scanning signal line S4, the second electrode of the driving transistor M0, and the gate of the driving transistor M0.

Referring to FIG. 4, the display panel 100 can include a first shift register 9 and a second shift register 10, the first shift register 9 is electrically connected to the fourth scanning signal line S4 electrically connected to the pixel circuit 2 located in the first sub-area 5, and the second shift register 10 is electrically connected to the fourth scanning signal line S4 electrically connected to the pixel circuit 2 located in the second sub-area 6.

When the display panel 100 displays different images, the second driving module 300 is also configured to: control the first shift register 9 to output, at the first frequency, the fourth scanning signal to the fourth scanning signal line S4 electrically connected to the first shift register 9, and control the second shift register 10 to output, at the second frequency, the fourth scanning signal to the fourth scanning signal line S4 electrically connected to the second shift register 10.

As described above, when the display panel 100 is driven at a low frequency of the second frequency, the data refresh cycle t2 of the pixel circuit 2 includes the low-frequency writing period WF_L and the holding period HF. When the pixel circuit 2 includes the data writing module 7 and the threshold compensation module 8, in some embodiments, with reference to FIG. 8, the third scanning signal line S3 and the fourth scanning signal line S4 each perform scanning at the second frequency, and in this case, during the low-frequency writing period WF_L, the data writing module 7 writes a data voltage $V_{Data}$ provided by the data line Data to the first electrode of the driving transistor M0, the threshold compensation module 8 writes the data voltage $V_{Data}$ to the gate of the driving transistor M0 and compensating a threshold of the driving transistor M0, and the charging frequency of the gate of the driving transistor M0 is the second frequency, that is, the pixel circuit 2 performs data refreshing at the second frequency.

Figure 18:
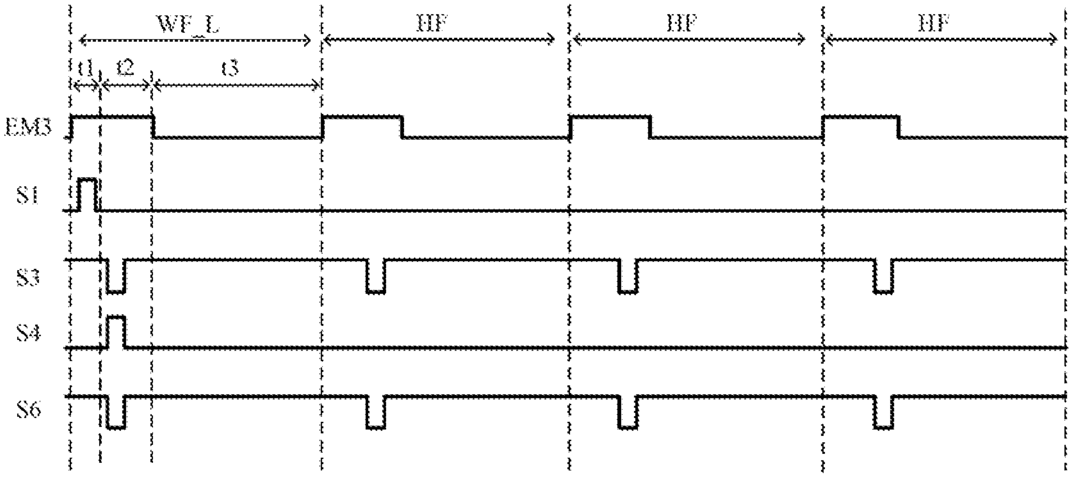
FIG. 18 is another timing sequence corresponding to FIG. 3.

In other embodiments, with reference to FIG. 18, the fourth scanning signal line S4 performs scanning at the second frequency, and the third scanning signal line S3 performs scanning at a frequency higher than the second frequency, e.g., the third scanning signal line S3 can perform scanning at the first frequency. In this case, during the holding period HF, the data writing module 7 can be used to write the bias voltage provided by the data line Data to the first electrode of the driving transistor M0, and also can be used to adjust the bias state of the driving transistor M0. Since the fourth scanning signal line S4 still scans at the second frequency, the threshold compensation module 8 does not operate during the holding period HF, the bias voltage cannot be written to the gate of the driving transistor M0 through the threshold compensation module 8, and in this case, the charging frequency of the driving transistor M0 is still the second frequency, that is, the pixel circuit 2 still performs data refreshing at the second frequency.

In conclusion, the data refresh frequency of pixel circuit 2 corresponds to the scanning frequency of the fourth scanning signal line S4.

When the position of the first sub-area 5 and the position of the second sub-area 6 are fixed, by using two independent sets of shift registers to drive the fourth scanning signal line S4 corresponding to the pixel circuit 2 located in the first sub-area 5 and the fourth scanning signal line S4 corresponding to the pixel circuit 2 located in the second sub-area 6, respectively, when the display panel 100 displays an image, the first shift register 9 and the second shift register 10 only can operate independently, and can output signals at different frequencies to control the pixel circuits 2 respectively located in different sub-areas to perform data refreshing at different frequencies. Such driving mode can control the driving frequencies of the two sub-areas independently, and the driving frequencies of the two sub-areas do not interfere with each other, reaching simple and accurate control.

In some embodiments, referring to FIG. 4, the display panel 100 includes a first voltage bus 11 and a second voltage bus 12. The first voltage bus 11 is electrically connected to the voltage regulating signal line 4 electrically connected to the pixel circuit 2 located in the first sub-area 5 and is configured to provide the first voltage. The second voltage bus 12 is electrically connected to the voltage regulating signal line 4 electrically connected to the pixel circuit 2 located in the second sub-area 6 and is configured to provide the second voltage.

FIG. 4 exemplarily illustrates the position of the first voltage bus 11 and the position of the second voltage bus 12. In other embodiments, the first voltage bus 11 and the second voltage bus 12 can also be located at a lower border, and in this case, some connection lines intersecting the extending directions of the voltage regulating signal lines 4 can be provided in the display area 1, and these connection lines are configured to electrically connect the voltage regulating signal line 4 and the first voltage bus 11 or to electrically connect the voltage regulating signal line 4 and the second voltage bus 12.

In the above configuration, the voltage regulating signal lines 4 corresponding to different sub-areas are electrically connected to different voltage buses, respectively. Different voltages are provided by different voltage buses, which can ensure that when the first sub-area 5 is driven at the high frequency, the voltage regulating signal line 4 in the first sub-area 5 can continuously and stably output the first voltage; and when the second sub-area 6 is driven at the low frequency, the voltage regulating signal line 4 in the second sub-area 6 can continuously and stably output the second voltage while driving at the low frequency. In this way, the first voltage and the second voltage can be used to reliably regulate the bias state of the driving transistor M0.

With such configuration, the first voltage bus 11 and the second voltage bus 12 each can only continuously provide a constant voltage signal, and there is no voltage jumping on the voltage, so as to avoid inaccurate adjustment to the bias state of the driving transistor M0 in the sub-area caused by too early voltage jumping or too late voltage jumping.

Figure 5:
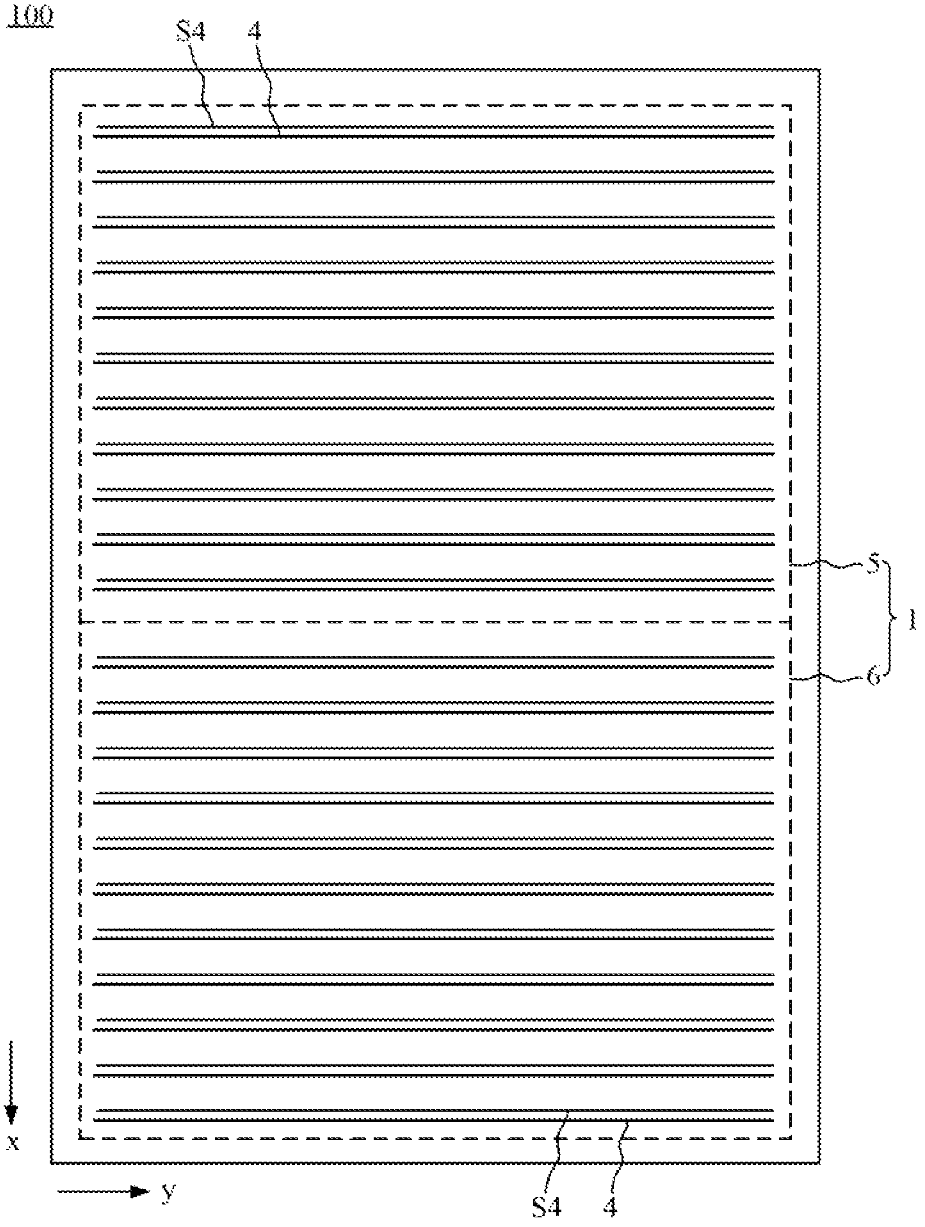
FIG. 5 is a top view of a display panel provided in an embodiment of the present disclosure.
Figure 6:
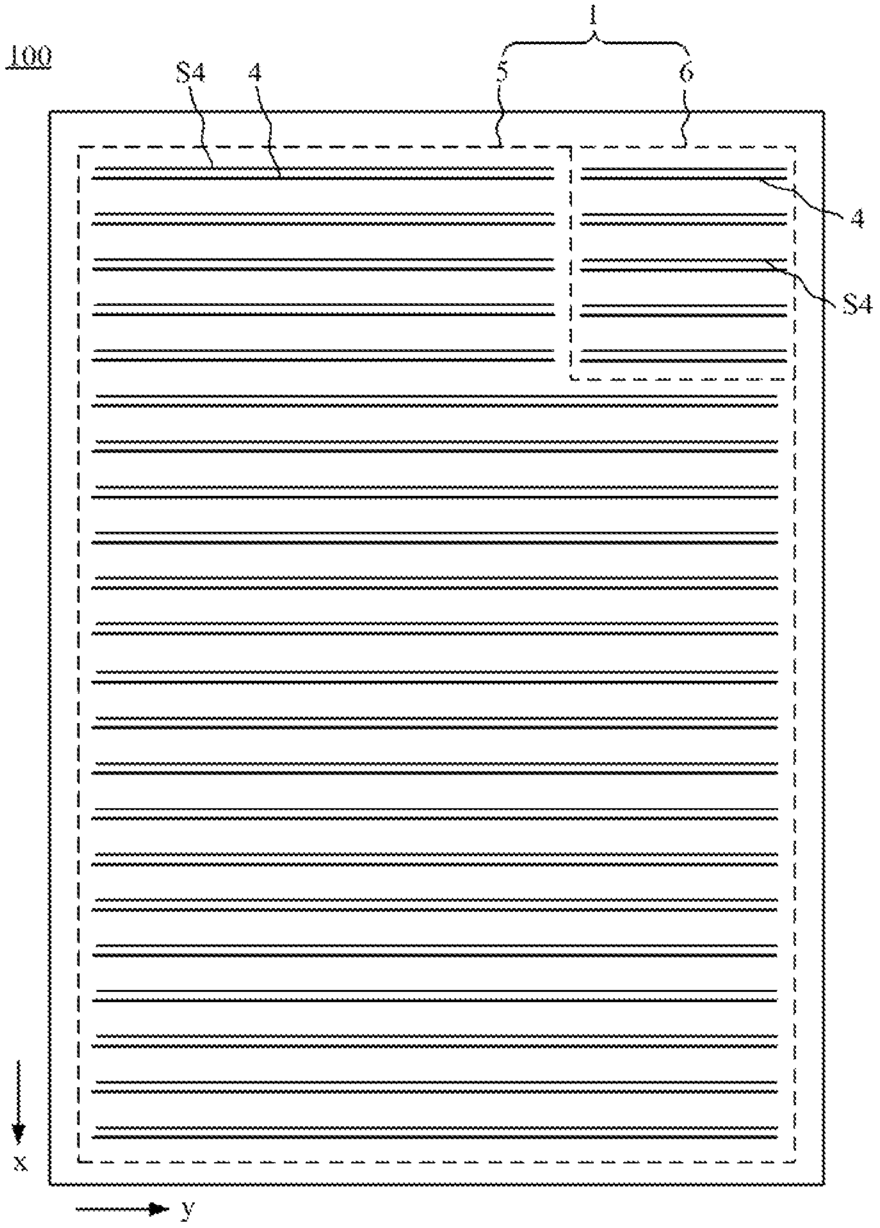
FIG. 6 is another top view of a display panel according to some embodiments of the present disclosure.

FIG. 5 is a top view of the display panel 100 according to some embodiments of the present disclosure, and FIG. 6 is another top view of the display panel 100 according to some embodiments of the present disclosure. When the position of the first sub-area 5 and the position of the second sub-area 6 are fixed, in some embodiments, as shown in FIG. 5, the first sub-area 5 and the second sub-area 6 are arranged along a first direction x. In some embodiments, as shown in FIG. 6, the first sub-area 5 surrounds the second sub-area 6, and the first sub-area 5 and the second sub-area 6 overlap in a second direction y, the fourth scanning signal line S4 extends along the second direction y, and the first direction x intersects with the second direction y.

When the first sub-area 5 and the second sub-area 6 are arranged along the first direction x, the display panel 100 can be regarded as having an upper screen and a lower screen, for example, the upper screen is configured to display games, videos, etc., and the lower screen is configured to display a keyboard and other images. In this case, the fourth scanning signal lines S4 in the first sub-area 5 and the second sub-area 6 are conventional entire lines, and there is no need to disconnect the fourth scanning signal line S4.

When the first sub-area 5 surrounds the second sub-area 6 and overlaps the second sub-area 6 overlap in the second direction y, exemplary, when the top corner of the display panel 100 is configured to display clock and other time information, other positions of the display panel 100 is configured to display other dynamic images, the display panel 100 can perform split-screen display at the top corner of the display panel 100. Such configuration is equivalent to a case where the conventional entire fourth scanning signal line S4 is disconnected at the boundary between the first sub-area 5 and the second sub-area 6, so that the fourth scanning signal lines S4 in the first sub-area 5 and the second sub-area 6 are independent of each other to achieve electrical connection to respective corresponding shift registers.

Figure 7:
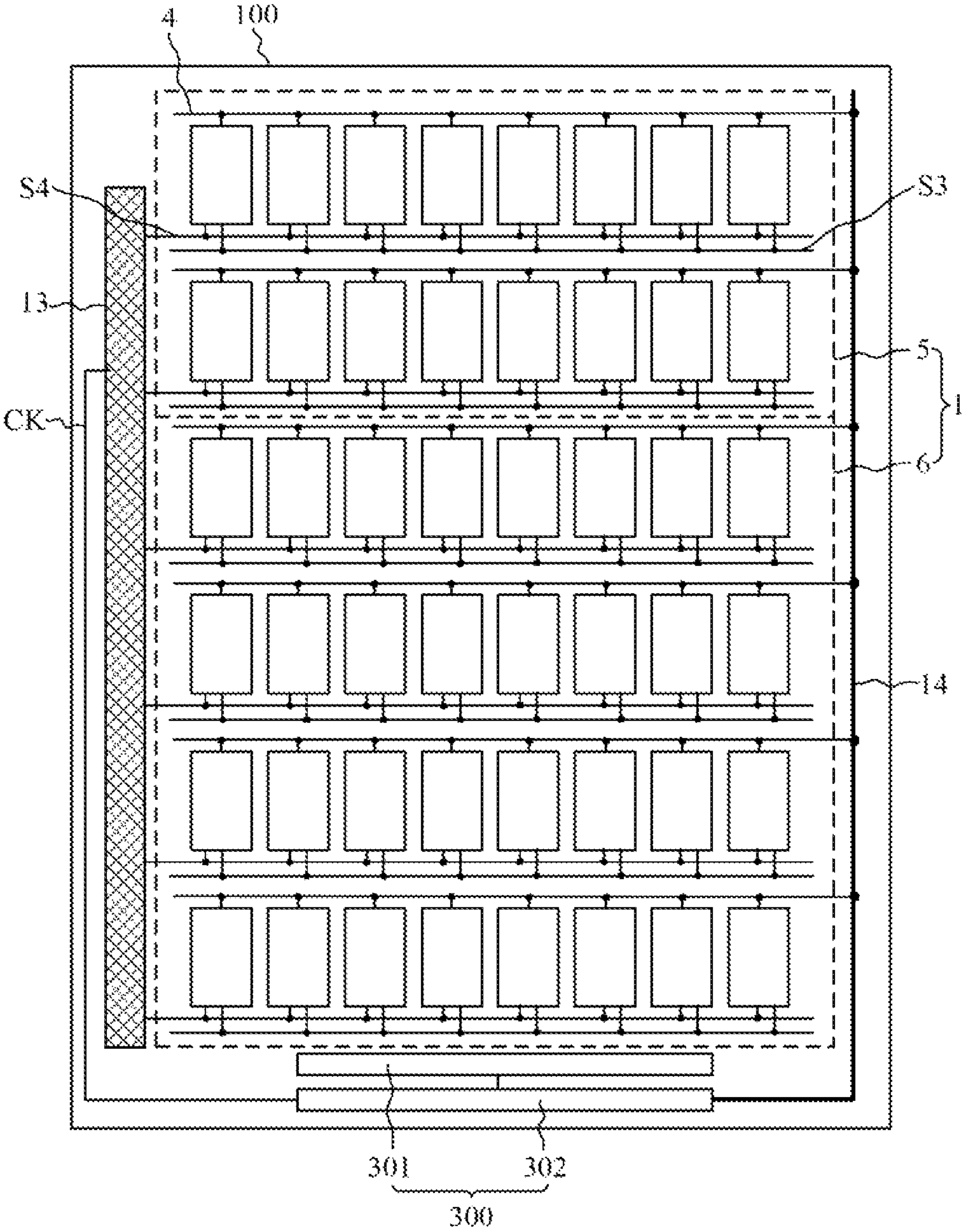
FIG. 7 is another top view of a display device according to some embodiments of the present disclosure.

FIG. 7 is another top view of a display device according to some embodiments of the present disclosure. When the display panel 100 drives different sub-areas at different frequencies, in some embodiments, as shown in FIG. 7, the position of the first sub-area 5 and the position of the second sub-area 6 are not fixed when the display panel 100 displays different images.

In this case, the second driving module 300 can include a division unit 301 and a control unit 302. The division unit 301 and the control unit 302 can be processing units for implementing different functions in the processor of the driver chip.

The division unit 301 is configured to: according to content of a to-be-displayed image of the display panel 100 in different areas, divide the display area 1 into the first sub-area 5 and the second sub-area 6, and generate position information of the first sub-area 5 and position information of the second sub-area 6.

The control unit 302 is electrically connected to the division unit 301 and is configured to: according to the position information of the first sub-area 5 and the position information of the second sub-area 6 that are generated by the division unit 301, control the pixel circuit 2 in the first sub-area 5 to perform data refreshing at the first frequency, control the voltage regulating signal line 4 electrically connected to the pixel circuit 2 located in the first sub-area 5 to provide a first voltage, control the pixel circuit 2 located in the second sub-area 6 to perform data refreshing at the second frequency, and control the voltage regulating signal line 4 electrically connected to the pixel circuit 2 located in the second sub-area 6 to provide a second voltage.

The position of the first sub-area 5 and the position of the second sub-area 6 that are shown in FIG. 7 are only exemplary position illustration in the to-be-displayed image, when the display panel 100 displays different images, the position of the first sub-area 5 and the position of the second sub-area 6 can vary.

In the above configuration, when the display panel 100 displays different images, the position of the first sub-area 5 and the position of the second sub-area 6 are set according to specific content to be displayed in the to-be-displayed image, and in this case, the position of the first sub-area 5 and the position of the second sub-area 6 can be flexibly adjusted according to the different displayed images, and the position division of the first sub-area 5 and the second sub-area 6 is flexible.

In some embodiments, with reference to FIG. 3, the pixel circuit 2 includes a data writing module 7 and a threshold compensation module 8, the data writing module 7 is electrically connected to a third scanning signal line S3, a data line Data, and the first electrode of the driving transistor M0, and the threshold compensation module 8 is electrically connected to a fourth scanning signal line S4, the second electrode of the driving transistor M0, and the gate of the driving transistor M0. As mentioned above, the data refresh frequency of the pixel circuit 2 corresponds to the scanning frequency of the fourth scanning signal line S4.

In conjunction with FIG. 7, the display panel 100 can include a third shift register 13 electrically connected to the fourth scanning signal line S4. The control unit 302 can also be configured to: when driving the first sub-area 5, control the third shift register 13 to output, at the first frequency, a fourth scanning signal to the fourth scanning signal S4 electrically connected to the pixel circuit 2 in the first sub-area 5; when driving the second sub-area 6, control the third shift register 13 to output, at the second frequency, a fourth scanning signal to the fourth scanning signal S4 electrically connected to the pixel circuit 2 located in the second sub-area 6.

In the above configuration, all fourth scanning signal lines S4 in the entire display area 1 are connected to a same third shift register 13. The control unit 302 is configured to control the third shift register 13 to output, at different frequencies, signals to the fourth scanning signal lines S4 located in different sub-areas according to only the determined position information of the first sub-area 5 and the position information of the second sub-area 6, and then the pixel circuits 2 in different sub-areas can be controlled to perform data refreshing at different frequencies.

In some embodiments, referring to FIG. 7 again, the third shift register 13 is electrically connected to a clock signal line CK. The control unit 302 is can also configured to: when driving the first sub-area 5, control the clock signal line CK to output a clock signal to the third shift register 13 at the first frequency; and when driving the second sub-area 6, control the clock signal line CK to output a clock signal to the third shift register 13 at the second frequency, so that the third shift register 13 output the fourth scanning signal at different frequencies when driven by the clock signal with different frequencies.

In some embodiments, referring to FIG. 7 again, the display panel 100 includes a third voltage bus 14 electrically connected to the voltage regulating signal lines 4. The control unit 302 can be configured to: when driving the first sub-area 5, control the third voltage bus 14 to output the first voltage, and when driving the second sub-area 6, control the third voltage bus 14 to output the second voltage.

In the above configuration, the voltage regulating signal lines 4 are electrically connected to a same third voltage bus 14, the control unit 302 can be configured to control the voltage provided by the third voltage bus 14 to jump when controlling the frequency of the signal output by the third shift register 13 to jump, thereby making the third voltage bus 14 to output corresponding voltages to the voltage regulating signal lines 4 located in different sub-areas.

Figure 8:
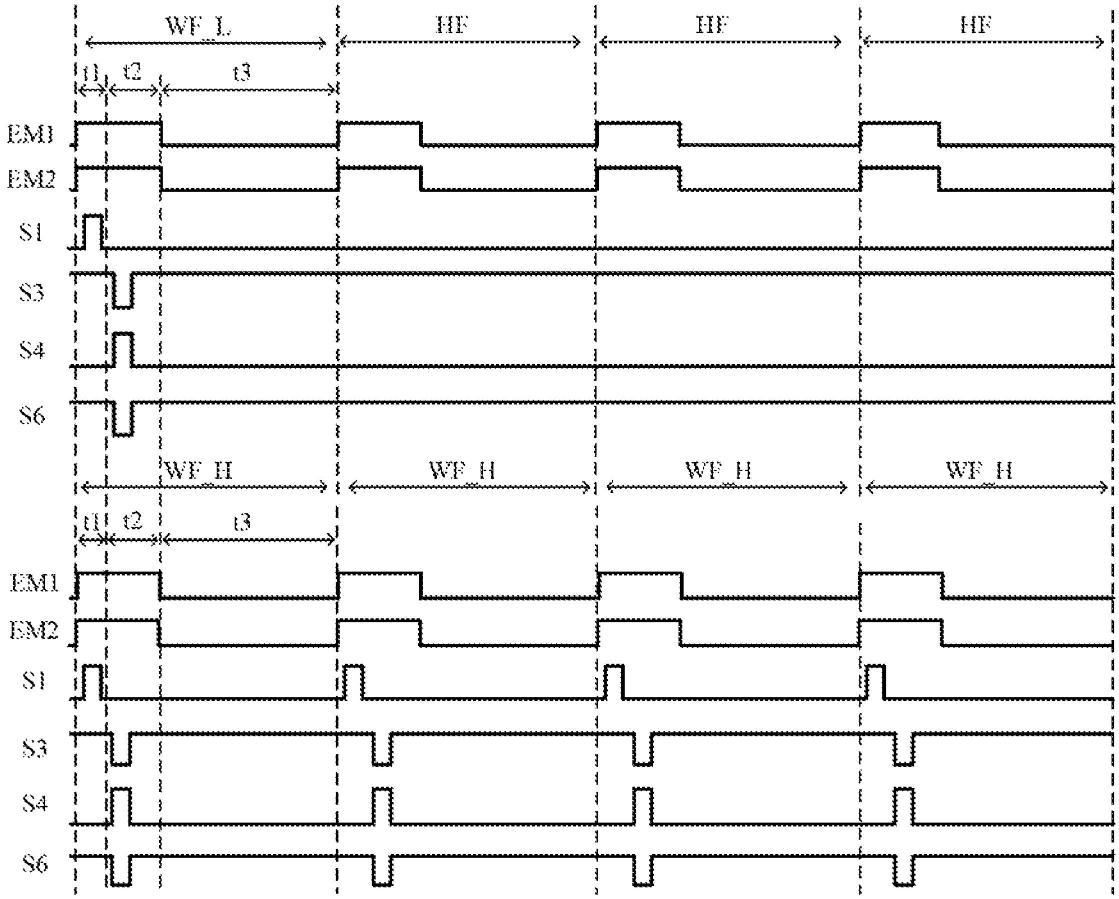
FIG. 8 is a timing sequence corresponding to FIG. 3.

FIG. 8 is a timing sequence corresponding to FIG. 3. In some embodiments, in conjunction with FIG. 3 and FIG. 8, the voltage regulating module 3 includes a gate reset module 15, and the voltage regulating signal line 4 includes a gate reset signal line Ref1. The gate reset module 15 is electrically connected to a first scanning signal line S1, the gate reset signal line Ref1, and the gate of the driving transistor M0.

When the pixel circuit 2 performs data refreshing at the first frequency, the first scanning signal line S1 performs scanning at the first frequency, and the gate reset signal line provides a first gate reset voltage. When the pixel circuit 2 performs data refreshing at the second frequency, the first scanning signal line S1 performs scanning at the second frequency, and the gate reset signal line provides a second gate reset voltage, and the first gate reset voltage is greater than the second gate reset voltage.

Taking the driving transistor M0 as a P-type transistor as an example, when the gate reset module 15 resets the gate of the driving transistor M0 in response to a first scanning signal provided by the first scanning signal line S1, a potential of the gate of the driving transistor M0 is the written gate reset voltage, and a potential of a source (first electrode) of the driving transistor M0 maintains a power voltage $V_{PVDD}$ maintained in the previous frame.

The complete operation process of the pixel circuit 2 shown in FIG. 3 will be described in detail later.

Defining that the first gate reset voltage is $V_{ref1}$ and the second gate reset voltage is $V_{ref1'}$, during the high-frequency writing period WF_H in the high-frequency driving mode, a voltage $V_{gs1}$ of the gate of the driving transistor M0 satisfies: $V_{gs1}=V_{ref1}-V_{PVDD}$, and during the low-frequency writing period WF_L in the low-frequency driving mode, a voltage $V_{gs1'}$ of the gate of the driving transistor M0 satisfies: $V_{gs1'}=V_{ref1}-V_{PVDD}$. In this way, since $V_{ref1}>V_{ref1'}$, $V_{gs1}>V_{gs1'}$.

When the driving transistor M0 is the P-type transistor, the gate reset voltage provided by the gate reset signal line is a negative number, so after the gate of the driving transistor M0 is reset, a gate/source voltage of the driving transistor M0 is also a negative number. Therefore, when $V_{gs1}>V_{gs1'}$, $V_{gs1}$ is closer to zero than $V_{gs1'}$, that is, a bias level of the driving transistor M0 during the high-frequency writing period WF_H is weaker than the bias level of the driving transistor M0 during the low-frequency writing period WF_L. In this case, during the high-frequency writing period WF_H, a negative offset of a threshold voltage $V_{th}$ of the driving transistor M0 is relatively small, so that the threshold voltage $V_{th}$ of the driving transistor M0 is relatively large, and thus the gate/source voltage of the driving transistor M0 is easier to be smaller than the threshold voltage $V_{th}$ of the driving transistor M0. In this way, the driving current converted by the driving transistor M0 can be increased, that is, the light-emitting brightness of the light-emitting element D within the high-frequency writing period WF_H can be increased.

After increasing the light-emitting brightness of the light-emitting element D in the high-frequency writing period WF_H, the difference between the brightness during the high-frequency writing period WF_H and the brightness during the holding period HF can be reduced, so as to weaken the screen flicker phenomenon when the display panel 100 switches between the low frequency and the high frequency, and weaken the brightness difference between different sub-areas when the display panel 100 drives different sub-areas at different frequencies, thereby improving the display uniformity.

Figure 9:
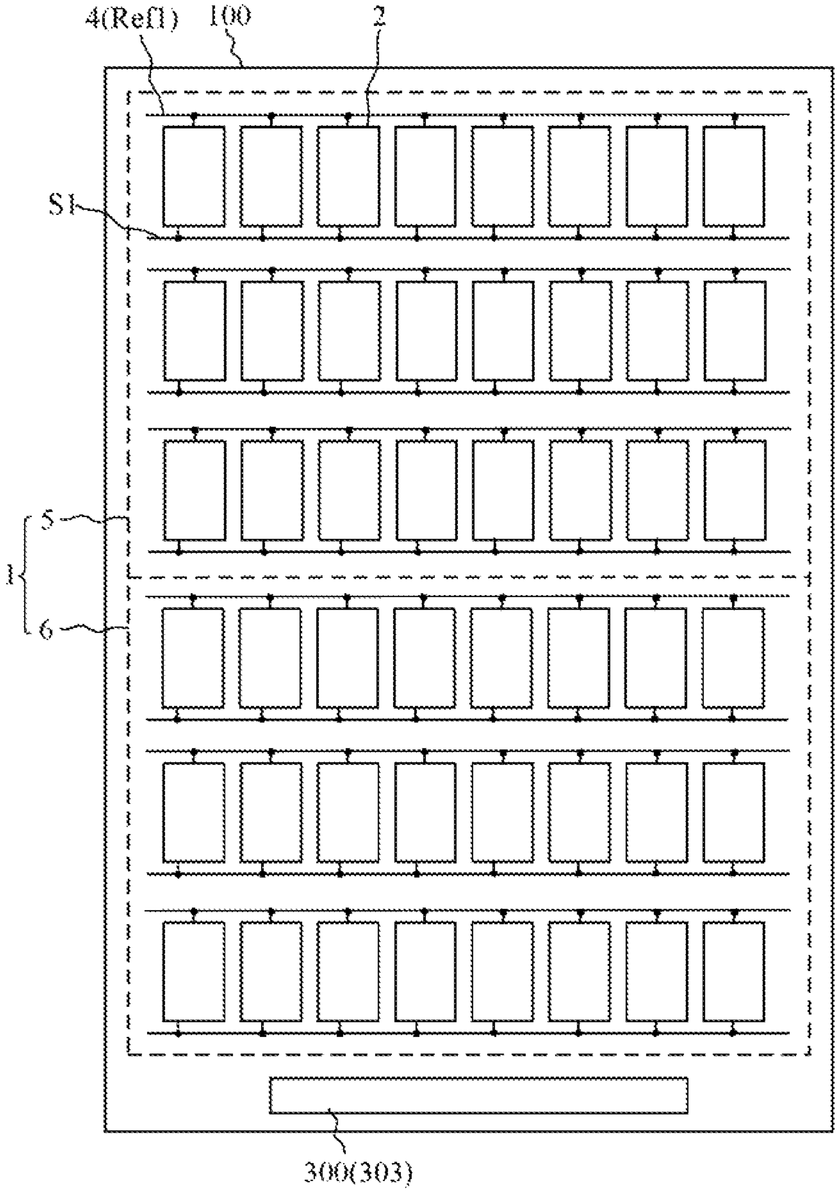
FIG. 9 is another top view of the display device according to some embodiments of the present disclosure.

FIG. 9 is another top view of a display device according to some embodiments of the present disclosure. In some embodiments, as shown in FIG. 9, the display device also includes a second driving module 300, and the second driving module 300 includes a gate reset driving sub-module 303.

The gate reset driving sub-module 303 is configured to: when the display panel 100 displays an image, control the pixel circuit 2 in the first sub-area 5 of the display area 1 to perform data refreshing at the first frequency, control the first scanning signal line S1 electrically connected to the pixel circuit 2 located in the first sub-area 5 to perform scanning at the first frequency, control the gate reset signal line electrically connected to the pixel circuit 2 located in the first sub-area 5 to provide the first gate reset voltage, and control the pixel circuit 2 in the second sub-area 6 of the display area 1 to perform data refreshing at the second frequency, control the first scanning signal line S1 electrically connected to the pixel circuit 2 located in the second sub-area 6 to perform scanning at the second frequency, and control the gate reset signal line electrically connected to the pixel circuit 2 located in the second sub-area 6 to provide the second gate reset voltage.

Combined with the above analysis, the above configuration can increase the light-emitting brightness of the light-emitting element D during the high-frequency writing period WF_H corresponding to the first sub-area 5, thereby weakening the overall display brightness difference between the first sub-area 5 and the second sub-area 6, improving the display uniformity of the display panel 100, and improving the split-screen phenomenon.

When the display panel 100 displays different images, the position of the first sub-area 5 and the position of the second sub-area 6 can be fixed, and in this case, the first scanning signal line S1 electrically connected to the pixel circuit 2 located in the first sub-area 5 and the first scanning signal line S1 electrically connected to the pixel circuit 2 located in the second sub-area 6 can be electrically connected to different shift registers and can be driven separately by the shift registers. The gate reset signal line Ref1 electrically connected to the pixel circuit 2 located in the first sub-area 5 and the gate reset signal line electrically connected to the pixel circuit 2 located in the second sub-area 6 can also be electrically connected to different gate reset buses, respectively, to receive voltages provided by different gate reset buses.

When the display panel 100 displays different images, the position of the first sub-area 5 and the position of the second sub-area 6 can be not fixed, and in this case, the first scanning signal line S1 electrically connected to the pixel circuit 2 located in the first sub-area 5 and the first scanning signal line S1 electrically connected to the pixel circuit 2 located in the second sub-area 6 can be electrically connected to a same shift register, and the gate reset signal line electrically connected to the pixel circuit 2 located in the first sub-area 5 and the gate reset signal line electrically connected to the pixel circuit 2 located in the second sub-area 6 can also be electrically connected to a same gate reset bus. In this case, only when driving different areas, a frequency of the signal output by the shift register is controlled to jump, and voltages output by the gate reset bus is controlled to jump.

In some embodiments, the display panel 100 has a third mode and a fourth mode, in the third mode, f1/f2=n, where f1 denotes the first frequency, and in the fourth mode, f1/f2=m, and n>m, where f2 denotes the second frequency. The first gate reset voltage provided by the first scanning signal line S1 electrically connected to the pixel circuit 2 located in the first sub-area 5 in the third mode is greater than the first gate reset voltage provided by the first scanning signal line S1 electrically connected to the pixel circuit 2 located in the first sub-area 5 in the fourth mode.

In the third mode, taking f1=120 Hz, f2=1 Hz, and n=120 as an example, within 1 s, the pixel circuit 2 in the first sub-area 5 performs data refreshing 120 times, which corresponds to 120 high-frequency writing periods WF_H, and the pixel circuit 2 in the second sub-area 6 performs data refreshing only once, which corresponds to one low-frequency writing period WF_L and 119 holding periods HF.

In the fourth mode, taking f1=120 Hz, f2=20 Hz, and m=6 as an example, within 1 s, the pixel circuit 2 in the first sub-area 5 performs data refreshing 120 times, which corresponds to 120 high-frequency writing periods WF_H, and the pixel circuit 2 in the second sub-area 6 performs data refreshing 20 times, which corresponds to 20 low-frequency writing periods WF_L and 100 holding periods HF.

Since within the same time, the number of holding periods HF in the third mode in the second sub-area 6 is greater than the number of holding periods HF in the fourth mode in the second sub-area 6, therefore, within the same time, the light-emitting brightness in the second sub-area 6 in the third mode is higher than the light-emitting brightness in the second sub-area 6 in the fourth mode. When there is a difference between the brightness during the holding period HF and the brightness during the high-frequency writing period WF_H, the brightness difference between the second sub-area 6 and the first sub-area 5 in the third mode will be greater.

In this regard, in the embodiments of the present disclosure, the first gate reset voltage $V_{ref1\_11}$ provided by the gate reset signal line electrically connected to the pixel circuit 2 in the first sub-area 5 in the third mode is greater than the first gate reset voltage $V_{ref1\_12}$ provided by the gate reset signal line electrically connected to the pixel circuit 2 in the first sub-area 5 in the fourth mode, which can make the gate/source voltage $V_{gs1\_1}$ ($V_{gs1\_1}=V_{ref1\_11}-V_{PVDD}$) of the driving transistor M0 of the pixel circuit 2 in the first sub-area 5 during the high-frequency writing period WF_H in the third mode, be greater than the gate/source voltage $V_{gs1\_2}$ ($V_{gs1\_2}=V_{ref1\_12}-V_{PVDD}$) of the driving transistor M0 of the pixel circuit 2 in the second sub-area 6 during the high-frequency writing period WF_H in the fourth mode. In this way, the bias state of the driving transistor M0 during the high-frequency writing period WF_H in the third mode is weaker, and the driving current converted by the driving transistor M0 is greater, which improves the overall brightness of the first sub-area 5 in the third mode and reduces the brightness difference between the first sub-area 5 and the second sub-area 6 in the third mode, thereby making the display panel 100 have a high display uniformity in different modes.

In some embodiments, referring again to FIG. 3, the gate reset module 15 includes a gate reset transistor M1, and the gate reset transistor M1 includes a gate electrically connected to the first scanning signal line S1, a first electrode electrically connected to the gate reset signal line Ref1, and a second electrode electrically connected to the gate of the driving transistor M0.

The gate reset transistor M1 is configured to be turned on by an enable level provided by the first scanning signal line S1, and writes the first gate reset voltage or the second gate reset voltage provided by the gate reset signal line to the gate driving transistor M0, so as to reset the gate of driving transistor M0.

Figure 10:
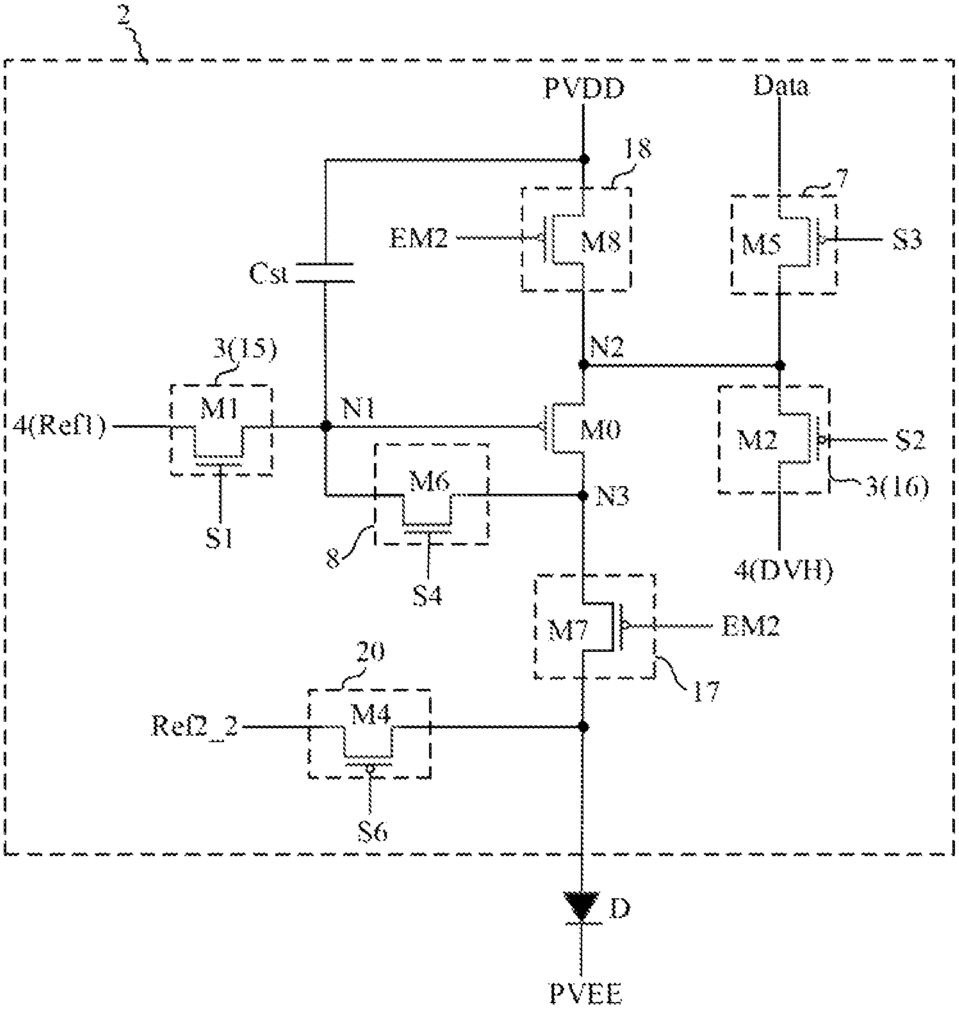
FIG. 10 is another schematic diagram of a pixel circuit according to some embodiments of the present disclosure.
Figure 11:
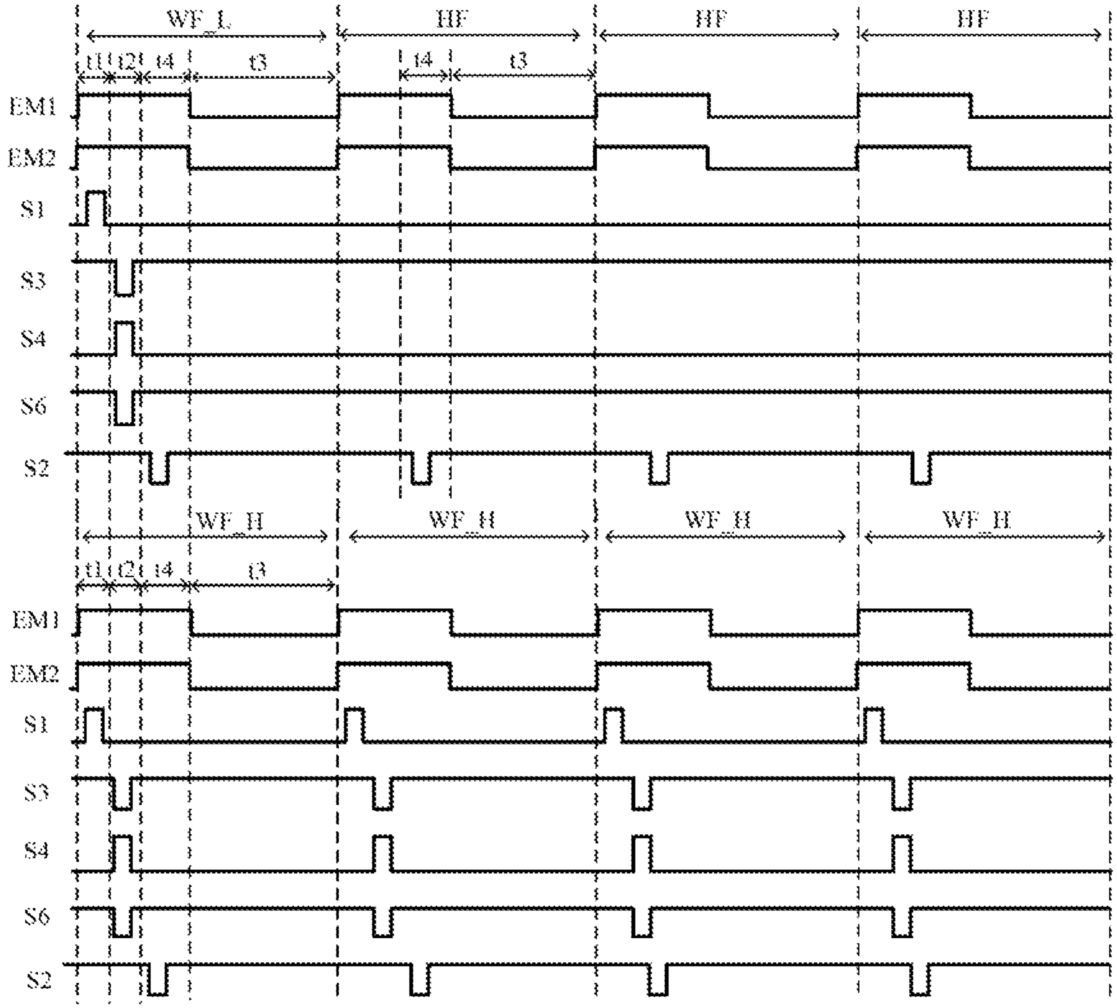
FIG. 11 is a timing sequence corresponding to FIG. 10.
Figure 12:
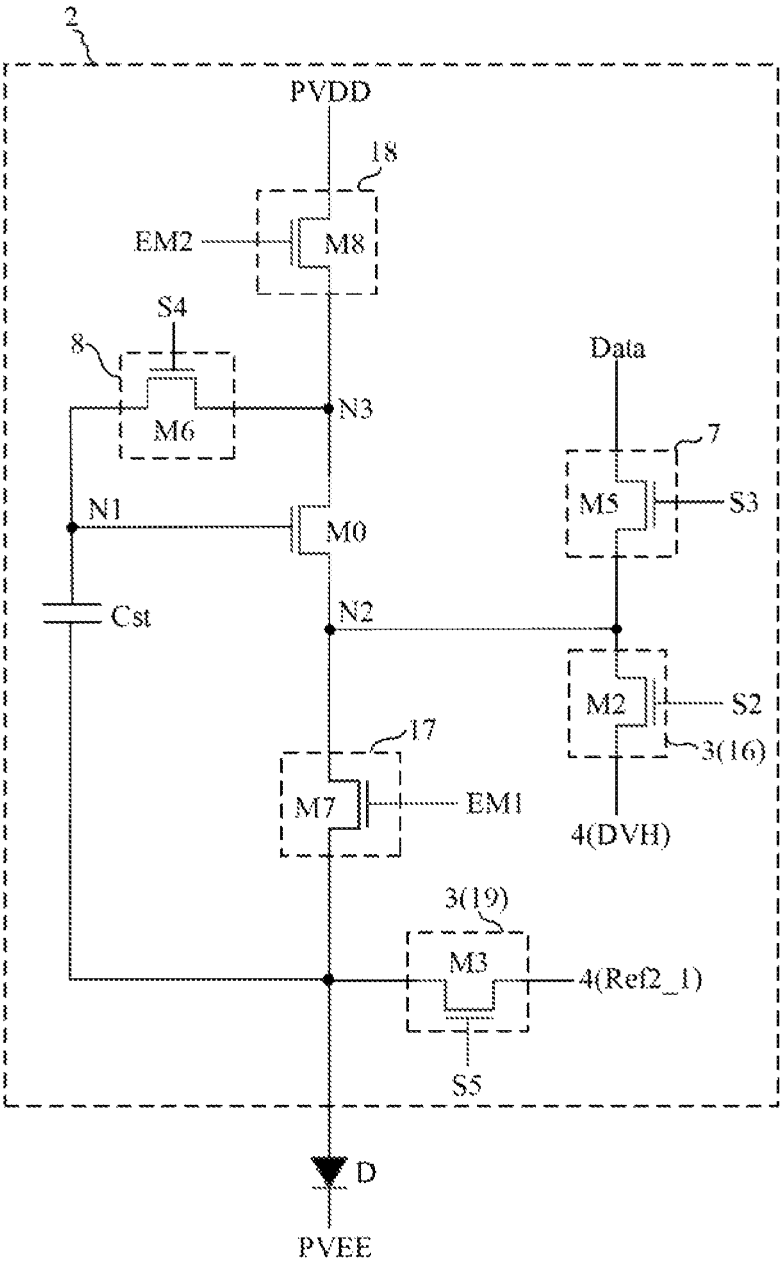
FIG. 12 is another schematic diagram of a pixel circuit according to some embodiments of the present disclosure.
Figure 13:
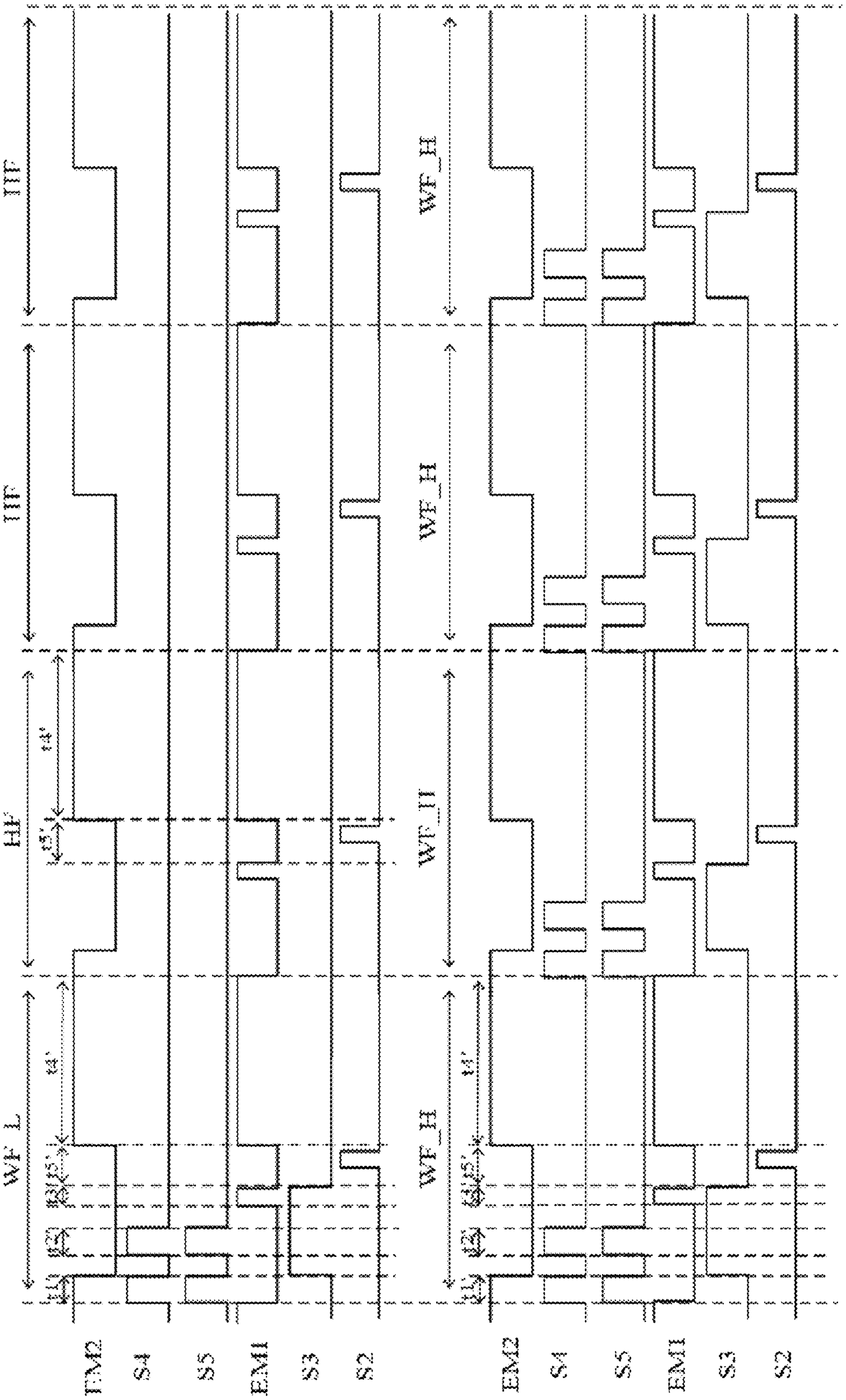
FIG. 13 is a timing sequence corresponding to FIG. 12.

FIG. 10 is another schematic diagram of the pixel circuit 2 according to some embodiments of the present disclosure, FIG. 11 is a timing sequence corresponding to FIG. 10, FIG. 12 is another schematic of the pixel circuit 2 according to some embodiments of the present disclosure, and FIG. 13 is a timing sequence corresponding to FIG. 12. In a some embodiments, as shown in FIG. 10 through FIG. 13, the voltage regulating module 3 includes a regulation module 16, the voltage regulating signal line 4 includes a bias-voltage signal line DVH, and the regulation module 16 is electrically connected to a second scanning signal line S2, the bias-voltage signal line DVH, and the first electrode of the driving transistor M0.

When the pixel circuit 2 performs data refreshing at the first frequency, the second scanning signal line S2 performs scanning at the first frequency, and the bias-voltage signal line DVH provides a first bias voltage. When the pixel circuit 2 performs data refreshing at the second frequency, the second scanning signal line S2 performs scanning at the first frequency, and the bias-voltage signal line DVH provides a second bias voltage greater than the first bias voltage.

In the circuit structure of the pixel circuit 2 shown in FIG. 10, the driving transistor M0 is a P-type transistor, the first electrode (source) of the driving transistor M0 is an electrode electrically connected to the power signal line PVDD through a second light-emitting control module 18, and the second electrode (drain) driving transistor M0 is an electrode electrically connected to the light-emitting element D through a first light-emitting control module 17. In the circuit structure of the pixel circuit 2 shown in FIG. 12, the driving transistor M0 is an N-type transistor, the first electrode (source) of the driving transistor M0 is an electrode electrically connected to the light-emitting element D through the first light-emitting control module 17, and the second electrode (drain) of the driving transistor M0 is an electrode electrically connected to the power signal line PVDD through the second light-emitting control module 18.

When the pixel circuit 2 performs data refreshing at the first frequency, during the high-frequency writing period WF_H, after performing the charging operation and before performing the light-emitting operation, the pixel circuit 2 can use the control module 16 to write the first bias voltage to the source (first electrode) of the driving transistor M0, to adjust the bias state of the driving transistor M0.

When the pixel circuit 2 performs data refreshing at the second frequency, during the low-frequency writing period WF_L, after performing the charging operation and before performing the light-emitting operation, the pixel circuit 2 can use the control module 16 to write the second bias voltage to the source (first electrode) of the driving transistor M0, to adjust the bias state of the driving transistor M0. During the holding period HF, before performing the light-emitting operation, the pixel circuit 2 can also use the control module 16 to write the second bias voltage to the source (first electrode) of the driving transistor M0, to adjust the bias state of the driving transistor M0.

The complete operation process of the pixel circuit 2 illustrated by FIG. 10 and FIG. 12 will be described in detail later.

It is defined that the first bias voltage is $V_{DVH}$ and the second bias voltage is $V_{DVH'}$. During the high-frequency writing period WF_H corresponding to the high-frequency driving mode, when the pixel circuit 2 performs the voltage-biasing operation, the voltage of the gate of the driving transistor M0 is $V_{Data}+V_{th}$, the voltage of the source of the driving transistor M0 is $V_{DVH}$, and the voltage of the gate of the driving transistor M0 is $V_{gs2}=V_{Data}+V_{th}-V_{DVH}$. During the holding period HF corresponding to the low-frequency driving mode, when the pixel circuit 2 performs voltage-biasing operation, the voltage of the gate of the driving transistor M0 maintains $V_{Data}+V_{th}$ provided in the low-frequency writing period WF_L, the voltage of the source of the driving transistor M0 is $V_{DVH'}$, and the voltage $V_{gs2'}$ of the gate of the driving transistor M0 satisfies: $V_{gs2'}=V_{Data}+V_{th}-V_{DVH'}$.

In the embodiments of the present disclosure, Vgs2' can be reduced by increasing VDVH', so as to enhance the bias state of the driving transistor M0 during the holding period HF, and then reduce the driving current converted by the driving transistor M0, and reduce the light-emitting brightness of the light-emitting element D during the holding period HF, thereby reducing difference between the brightness during the holding period HF and the brightness during the high-frequency writing period WF_H and improving the screen flicker phenomenon or the display uniformity.

After reducing the brightness during the holding period HF, the difference between the brightness during the holding period HF and the brightness during the low-frequency writing period WF_L can also be reduced, and when the display panel 100 is driven at the low frequency, the flicker phenomenon generated when the display panel changes from the low-frequency writing period WF_L to the holding period HF can be weakened.

Figure 14:
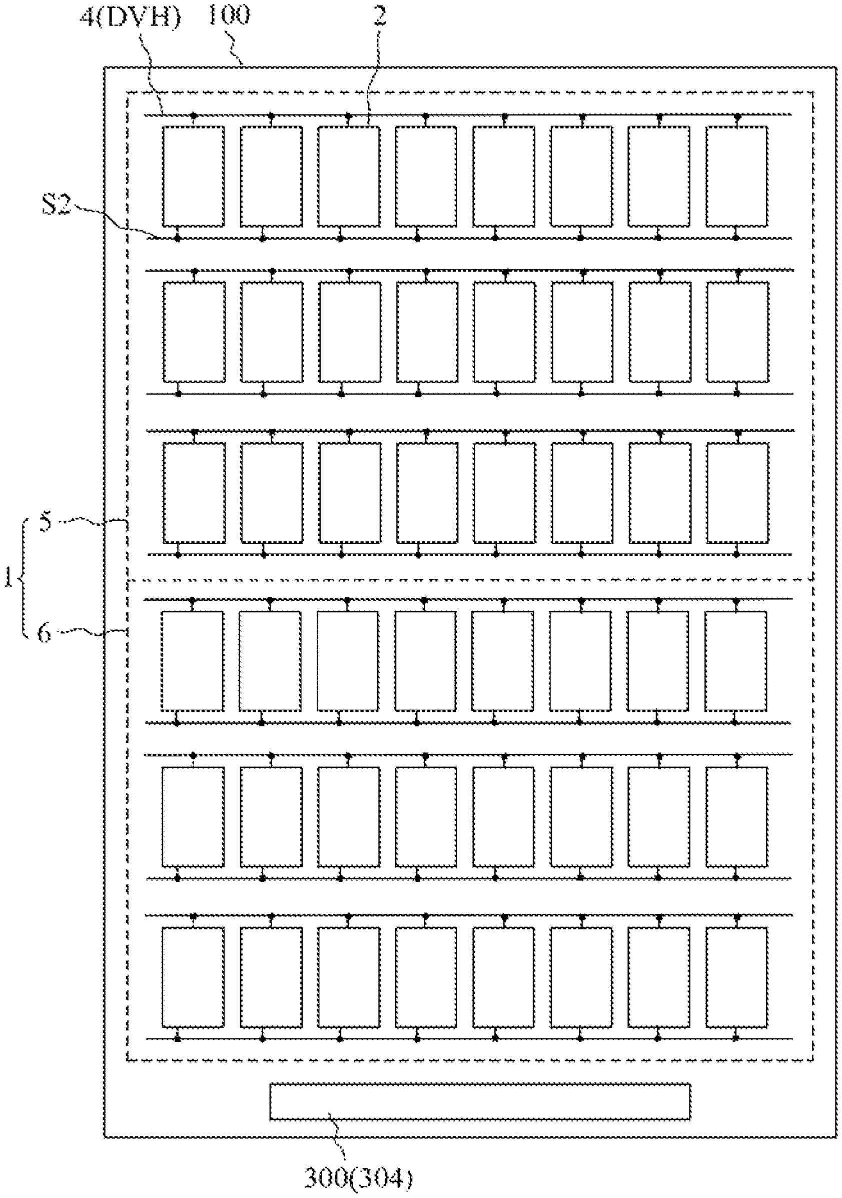
FIG. 14 is another top view of a display device according to some embodiments of the present disclosure.

FIG. 14 is another top view of a display device according to some embodiments of the present disclosure. In some embodiments, as shown in FIG. 14, the display device includes a second driving module 300, and the second driving module 300 includes a bias-voltage driving sub-module 304.

The bias-voltage driving sub-module 304 is configured to: when the display panel 100 displays an image, control the pixel circuit 2 in the first sub-area 5 of the display area 1 to perform data refreshing at the first frequency, control the second scanning signal line S2 electrically connected to the pixel circuit 2 in the first sub-area 5 to performs scanning at the first frequency, and control the bias-voltage signal line DVH electrically connected to the pixel circuit 2 in the first sub-area 5 to provide the first bias voltage; and control the pixel circuit 2 in the second sub-area 6 of the display area 1 to perform data refreshing at the second frequency, control the second scanning signal line S2 electrically connected to the pixel circuit 2 in the second sub-area 6 to perform scanning at the second frequency, and control the bias-voltage signal line DVH electrically connected to the pixel circuit 2 in the second sub-area 6 to provide the second bias voltage.

As described above, the embodiments of the present disclosure can reduce the brightness during the holding period HF, thereby reducing the difference between the brightness during the high-frequency writing period WF_H and the brightness during the holding period HF, so that when the display panel 100 drives different sub-areas at different frequencies, the overall display brightness difference between the first sub-area 5 and the second sub-area 6 can be significantly improved, thereby improving the display uniformity of the display panel 100.

When displaying different screens in the display panel 100, the position of the first sub-area 5 and the position of the second sub-area 6 can be fixed. In this case, the second scanning signal line S2 electrically connected to the pixel circuit 2 located in the first sub-area 5 and the second scanning signal line S2 electrically connected to the pixel circuit 2 located in the second sub-area 6 can be electrically connected to different shift registers, respectively, and be driven separately by the shift registers. The bias-voltage signal line DVH electrically connected to the pixel circuit 2 located in the first sub-area 5 and the bias-voltage signal line DVH electrically connected to the pixel circuit 2 located in the second sub-area 6 can also be electrically connected to different bias buses, respectively, to receive the voltage provided by different bias buses.

When the display panel 100 displays different images, the position of the first sub-area 5 and the position of the second sub-area 6 can be not fixed. In this case, the second scanning signal line S2 electrically connected to the pixel circuit 2 located in the first sub-area 5 and the second scanning signal line S2 electrically connected to the pixel circuit 2 located in the second sub-area 6 can be electrically connected to a same shift register, the bias-voltage signal line DVH electrically connected to the pixel circuit 2 located in the first sub-area 5 and the bias-voltage signal line DVH electrically connected to the pixel circuit 2 located in the second sub-area 6 can also be electrically connected to a same bias bus, and in this case, only when different sub-areas are driven, the frequency of the signal output by the shift register is controlled to jump, and the voltage output by the bias bus is controlled to jump.

In some embodiments, referring to FIG. 10 and FIG. 12, the regulating module 16 includes a regulation transistor M2, and the regulation transistor M2 includes a gate electrically connected to the second scanning signal line S2, a first electrode electrically connected to the bias-voltage signal line DVH, and a second electrode electrically connected to the first electrode of the driving transistor M0.

The regulation transistor M2 is configured to be turned on under the enable level provided by the second scanning signal line S2, and to transmit the first bias voltage or the second bias voltage provided by the bias-voltage signal line DVH to the first electrode of the driving transistor M0, thereby adjusting the bias state of the driving transistor M0.

Figure 15:
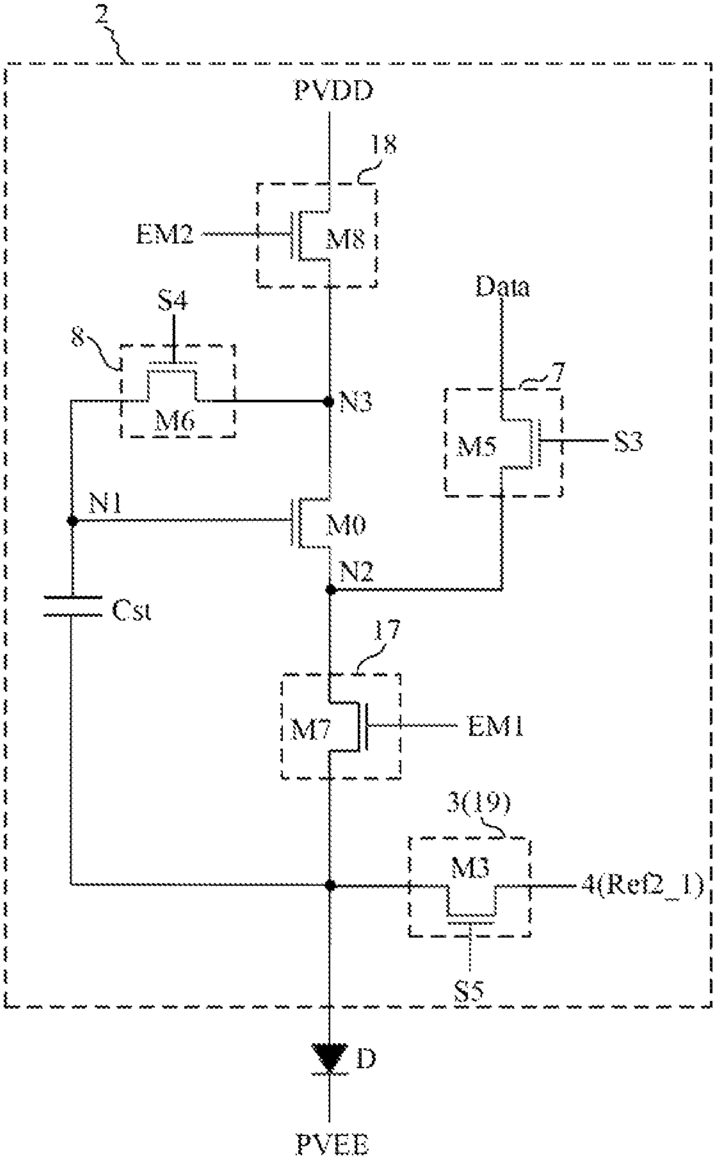
FIG. 15 is another schematic diagram of a pixel circuit according to some embodiments of the present disclosure.
Figure 16:
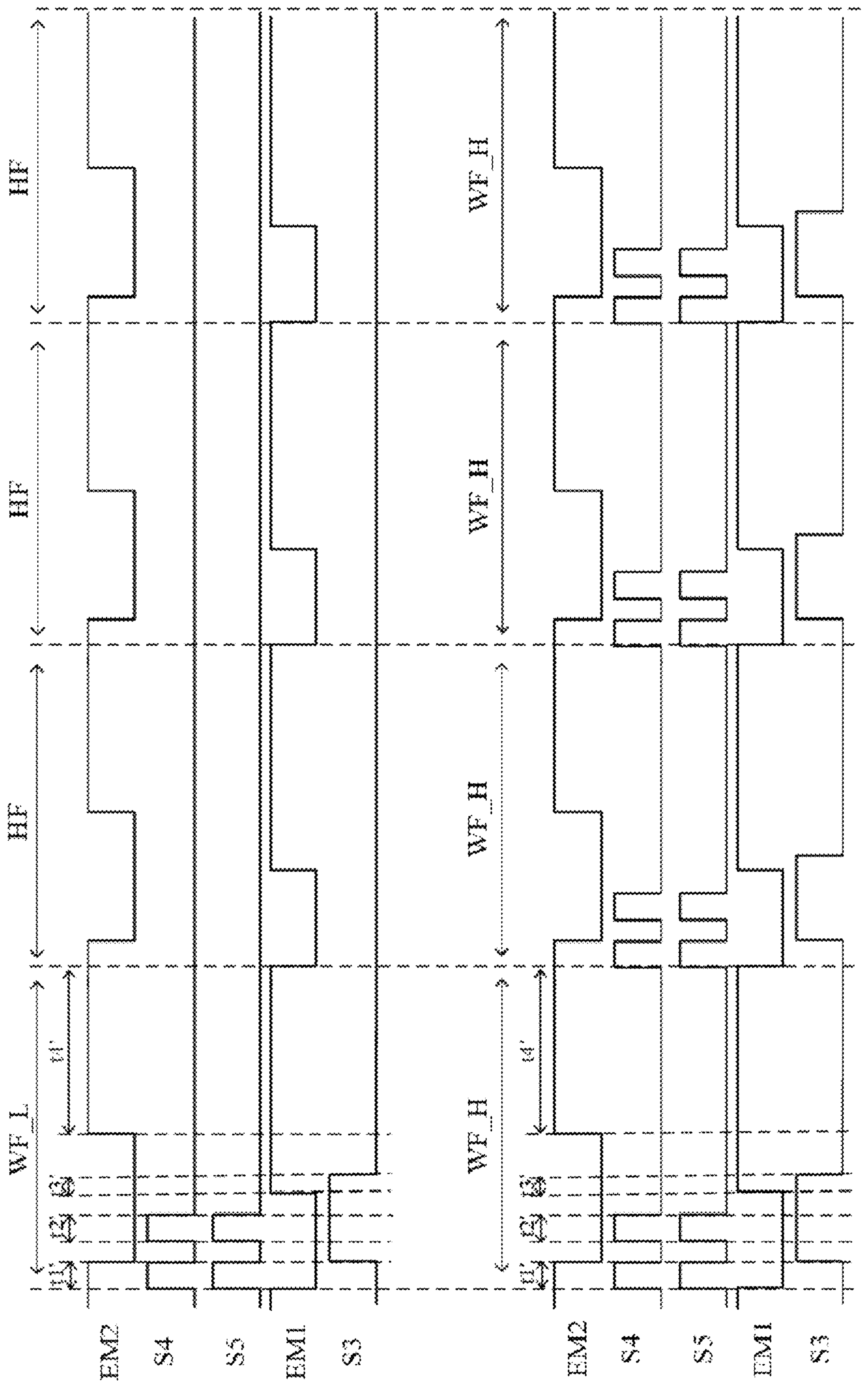
FIG. 16 is a timing sequence corresponding to FIG. 15.

FIG. 15 is another schematic of a pixel circuit 2 according to some embodiments of the present disclosure, and FIG. 16 is a timing sequence corresponding to FIG. 15. In some embodiments, as shown in FIG. 15 and FIG. 16, the voltage regulating module 3 includes a first anode reset module 19, and the voltage regulating signal line 4 includes a first anode reset signal line Ref2_1. The first anode reset module 19 is electrically connected to a fifth scanning signal line S5, the first anode reset signal line Ref2_1, and an anode of the light-emitting element D.

The pixel circuit 2 can also include a data writing module 7, a threshold compensation module 8, a first light-emitting control module 17, and a memory capacitor $C_{st}$. The data writing module 7 is electrically connected between the data line Data and the first electrode of the driving transistor M0, the threshold compensation module 8 is electrically connected between the second electrode of the driving transistor M0 and the gate of the driving transistor M0, the first light-emitting control module 17 is electrically connected between the first electrode of the driving transistor M0 and the anode of the light-emitting element D, and the storage capacitor $C_{st}$ is electrically connected between the gate of the driving transistor M0 and the anode of the light-emitting element D.

When the pixel circuit 2 performs data refreshing at the first frequency, the driving cycle of the pixel circuit 2 includes a high-frequency writing period WF_H, and when the pixel circuit 2 performs data refreshing at the second frequency, the driving cycle of the pixel circuit 2 includes a low-frequency writing period WF_L. The high-frequency writing period WF_H and low-frequency writing period WF_L each include a reset sub-period t1', a charging sub-period t2', a modulation sub-period t3', and a light-emitting sub-period t4'.

During the reset sub-period t1', the first anode reset module 19 writes the voltage provided the first anode reset signal line Ref2_1 to the anode of the light-emitting element D. During the charging sub-period t2', the data writing module 7 writes the data voltage provided by the data line Data to the first electrode of the driving transistor M0, and the threshold compensation module 8 writes the data voltage to the gate of the driving transistor M0 and compensates the threshold of the driving transistor M0. During the modulation sub-period t3', the data writing module 7 writes the data voltage provided by the data line Data to the first electrode of the driving transistor M0, and the first light-emitting control module 17 writes the data voltage of the first electrode driving transistor M0 to the anode of the light-emitting element D.

When the pixel circuit 2 performs data refreshing at the first frequency, the fifth scanning signal line S5 performs scanning at the first frequency, and the first anode reset signal line Ref2_1 provides a first anode reset voltage. When the pixel circuit 2 performs data refreshing at the second frequency, the fifth scanning signal line S5 performs scanning at the second frequency, and the first anode reset signal line Ref2_1 provides a second anode reset voltage. The first anode reset voltage is greater than the second anode reset voltage.

Taking the driving transistor M0 as an N-type transistor as an example, during the reset sub-period t1', the first anode reset module 19 writes the voltage provided by the first anode reset signal line Ref2_1 to the anode of the light-emitting element D, and in this case, a potential of the anode of the light-emitting element D is an anode reset voltage Vref2.

During the charging sub-period t2', the data writing module 7 writes the data voltage provided by the data line $V_{Data}$ to the first electrode of the driving transistor M0, the threshold compensation module 8 writes the data voltage $V_{Data}$ to the gate of the driving transistor M0 and compensates the threshold of the driving transistor M0, and at this time, the potential of the gate of the driving transistor M0 is $V_{Data}+V_{th}$.

During the modulation sub-period t3', the data writing module 7 writes the data voltage provided by the data line Data $V_{Data}$ to the first electrode of the driving transistor M0, and the first light-emitting control module 17 writes the data voltage of the first electrode of the driving transistor M0 to the anode of the light-emitting element D. At this time, the potential of the anode of the light-emitting element D jumps from $V_{ref2}$ to $V_{Data}$, and the voltage difference the potential of the anode of the light-emitting element D is $V_{Data}-V_{ref2}$. Based on the characteristics of the storage capacitor $C_{st}$ that the voltage difference between two ends of the storage capacitor $C_{st}$ remain unchanged, the potential of the electrode plate in the storage capacitor $C_{st}$ electrically connected to the gate of the driving transistor M0 will change $V_{Data}-V_{ref2}$ as the potential of the electrode plate of the storage capacitor $C_{st}$ electrically connected to the anode of the light-emitting element D changes $V_{Data}-V_{ref2}$, so that the potential of the gate of the driving transistor M0 becomes $2V_{Data}+V_{th}-V_{ref2}$. In this case, the gate/source voltage Vgs2 of the driving transistor M0 satisfies $V_{gs2}=2V_{Data}+V_{th}-V_{ref2}-V_{Data}=V_{Data}+V_{th}-V_{ref2}$.

The complete operation process of the pixel circuit 2 shown in FIG. 15 will be described in detail later.

It is defined that the first anode reset voltage is $v_{ref2\_1}$ and the second anode reset voltage is $V_{ref2\_1'}$. During the high-frequency writing period WF_H in the high-frequency driving mode, before emitting light, the gate/source voltage of the driving transistor M0 satisfies $V_{gs2}=V_{Data}+V_{th}-V_{ref2\_1}$. During the low-frequency writing period WF_L in the low-frequency driving mode, before emitting light, the gate/source voltage of the driving transistor M0 satisfies $V_{gs2'}=V_{Data}+V_{th}-V_{ref2\_1'}$.

Since $V_{ref2\_1}>V_{ref2\_1'}$, $V_{gs2}<V_{gs2'}$, which indicates that the bias degree of $V_{gs2}$ is relatively small. That is, the bias level of the driving transistor M0 during the high-frequency writing period WF_H is weaker than the bias level of the driving transistor M0 during the low-frequency writing period WF_L. In this case, during the high-frequency writing period WF_H, a positive offset of the threshold voltage $V_{th}$ of the driving transistor M0 is relatively low, so that the threshold voltage $V_{th}$ of the driving transistor M0 is relatively small and it is easier to meet the condition that the gate/source voltage of the driving transistor M0 is greater than the threshold voltage $V_{th}$ of the driving transistor M0, thereby increasing the driving current converted by the driving transistor M0, that is, increasing the light-emitting brightness of the light-emitting element D during the high-frequency writing period WF_H.

After increasing the light-emitting brightness of the light-emitting element D during the high-frequency writing period WF_H, the difference between the brightness during the high-frequency writing period WF_H and the brightness during the holding period HF can be reduced, so as to weaken the screen flicker phenomenon when the display panel 100 switches between the low frequency and the high frequency, and so as to weaken the brightness difference between different sub-areas and improve the display uniformity when the display panel 100 controls different sub-areas at different frequencies.

Figure 17:
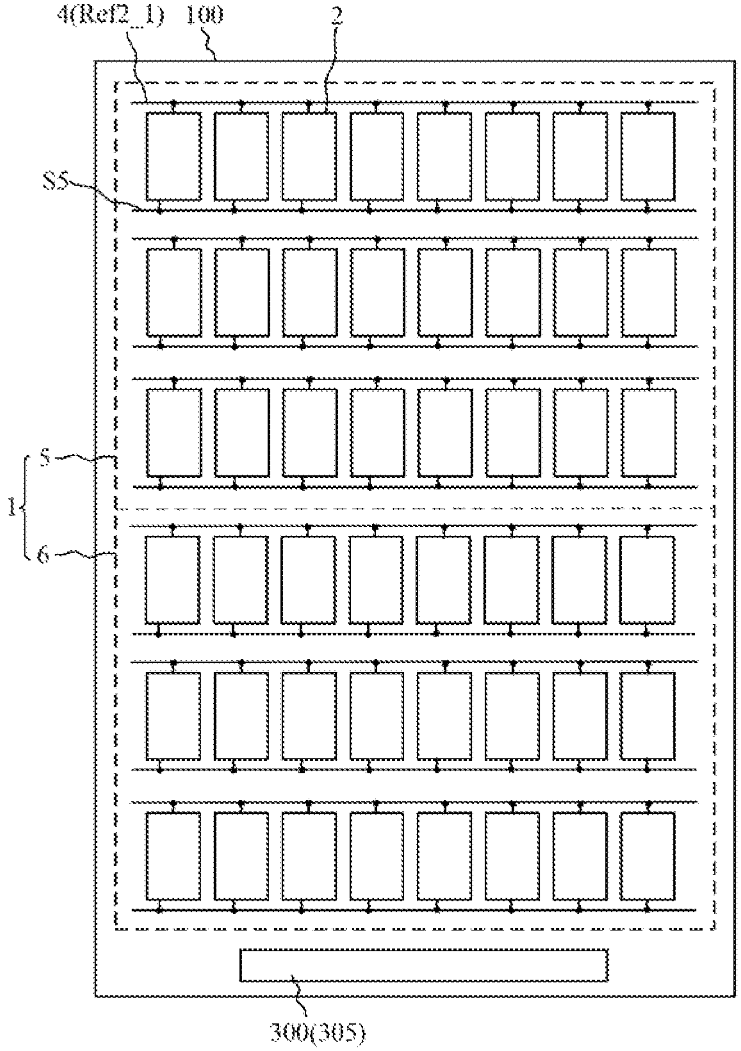
FIG. 17 is another top view of a display device according to some embodiments of the present disclosure.

FIG. 17 is another top view of a display device according to some embodiments of the present disclosure. In some embodiments, as shown in FIG. 17, the display device also includes a second driving module 300 including an anode reset driving sub-module 305.

The anode reset driving sub-module 305 is configured to: when the display panel 100 displays an image, control the pixel circuit 2 in the first sub-area 5 of the display area 1 to perform data refreshing at the first frequency, control the fifth scanning signal line S5 electrically connected to the pixel circuit 2 located in the first sub-area 5 to perform scanning at the first frequency, control the first anode reset signal line Ref2_1 electrically connected to the pixel circuit 2 located in the first sub-area 5 to provide the first anode reset voltage; and control the pixel circuit 2 in the second sub-area 6 of the display area 1 to perform data refreshing at the second frequency, control the fifth scanning signal line S5 electrically connected to the pixel circuit 2 in the second sub-area 6 of the display area 1 to perform scanning at the second frequency, and control the first anode reset signal line Ref2_1 electrically connected to the pixel circuit 2 located in the second sub-area 6 to provide the second anode reset voltage.

Combined with the above analysis, the above configuration can improve the light-emitting brightness of the light-emitting element D during the high-frequency writing period WF_H corresponding to the first sub-area 5, thereby weakening the overall display brightness difference between the first sub-area 5 and the second sub-area 6, improving the display uniformity of the display panel 100, and improving the split-screen phenomenon.

When the display panel 100 displays different images, the position of the first sub-area 5 and the position of the second sub-area 6 can be fixed. In this case, the fifth scanning signal line S5 electrically connected to the pixel circuit 2 located in the first sub-area 5 and the fifth scanning signal line S5 electrically connected to the pixel circuit 2 located in the second sub-area 6 can be electrically connected to different shift registers and driven by the shift registers independently. The first anode reset signal line electrically connected to the pixel circuit 2 located in the first sub-area 5 Ref2_1 and the first anode reset signal line Ref2_1 electrically connected to the pixel circuit 2 located in the second sub-area 6 can also be electrically connected to different first anode reset buses, to receive the voltages provided by different first anode reset buses.

When the display panel 100 displays different images, the position of the first sub-area 5 and the position of the second sub-area 6 can be not fixed. In this case, the fifth scanning signal line S5 electrically connected to the pixel circuit 2 located in the first sub-area 5 and the fifth scanning signal line S5 electrically connected to the pixel circuit 2 located in the second sub-area 6 can be electrically connected to a same shift register, and the first anode reset signal line Ref2_1 electrically connected to the pixel circuit 2 located in the first sub-area 5 and the first anode reset signal line Ref2_1 electrically connected to the pixel circuit 2 located in the second sub-area 6 can also be electrically connected to a same first anode reset bus. In this case, only when driving different areas, the frequency of the signal output by the shift register is controlled to jump, and the voltage output by the first anode reset bus is controlled to jump.

In some embodiments, referring to FIG. 15, the first anode reset module 19 includes a first anode reset transistor M3, and the first anode reset transistor M3 includes a gate electrically connected to the fifth scanning signal line S5, a first electrode electrically connected to the first anode reset signal line Ref2_1, and a second electrode electrically connected to the anode of the light-emitting element D.

The first anode reset transistor M3 is configured to be turned on under the enable level provided by the fifth scanning signal line S5, and the first anode reset voltage or the second anode reset voltage provided by the first anode reset signal line Ref2_1 is written to the anode of the light-emitting element D to reset the anode of the light-emitting element D.

FIG. 18 is another timing sequence corresponding to FIG. 3. In one some embodiments, in conjunction with FIG. 3 and FIG. 18, the pixel circuit 2 also includes a second anode reset module 20, and the second anode reset module 20 is electrically connected to a sixth scanning signal line S6, a second anode reset signal line Ref2_2, and the anode of the light-emitting element D.

When the pixel circuit 2 performs data refreshing at the first frequency, the sixth scanning signal line S6 performs scanning at the first frequency, and the second anode reset signal line Ref2_2 provides a third anode reset voltage. When the pixel circuit 2 performs data refreshing at the second frequency, the sixth scanning signal line S6 performs scanning at a third frequency, and the second anode reset signal line Ref2_2 provides a fourth anode reset voltage. The third frequency is greater than the second frequency. The third frequency is smaller than or equal to the first frequency. The fourth anode reset voltage is smaller than the third anode reset voltage.

When the anode of the light-emitting element D is reset, the second anode reset module 20 writes the anode reset voltage provided by the second anode reset signal line Ref2_2 to the anode of the light-emitting element D. Since the third frequency is greater than the second frequency, when the pixel circuit 2 performs data refreshing at the second frequency, within at least one of the holding periods HF, the second anode reset module 20 will also reset the anode of the light-emitting element D. For example, the first frequency and the third frequency each are 120 Hz, and the second frequency is 1 Hz, and at this time, within the 119 holding periods HF under driving at 1 Hz, and all sixth scanning signal lines S6 control the second anode reset modules 20 to reset the anodes of the light-emitting elements D.

It is defined that the third anode reset voltage is $V_{ref2\_2}$ and the fourth anode reset voltage is $V_{ref2\_2'}$. In some embodiments of the present disclosure, $V_{ref2\_2'}<V_{ref2\_2}$, the initial voltage after the anode of the light-emitting element D is reset during the holding period HF can be reduced, so that the potential of the anode of the light-emitting element D is charged from a lower initial voltage to a light-emitting voltage corresponding to the driving current when the driving current converted by the driving transistor M0 is subsequently transmitted to the anode of the light-emitting element D. In this way, the charging speed of the anode of the light-emitting element D can slow down, so that the brightness of the light-emitting element D increases slowly and then the light-emitting brightness of the light-emitting element D during the holding period HF is reduced, thereby reducing the difference between the brightness during the holding period HF and the brightness during the high-frequency writing period WF_H, and improving the screen flicker phenomenon or improving the display uniformity.

After reducing the brightness of the holding period HF, the difference between the brightness during the holding period HF and the brightness during the low-frequency writing time WF_L can also be reduced, and when the display panel 100 is driven at the low frequency, the flicker phenomenon generated when the display panel 100 enters the holding period HF from the low-frequency writing period WF_L can also be weakened.

In some embodiments, the third anode reset voltage is equal to the first gate reset voltage, and the fourth anode reset voltage is equal to the second gate reset voltage. In this case, the second anode reset module 20 and the gate reset module 15 in the pixel circuit 2 can be electrically connected to a same reset signal line, reducing the number of reset signal lines and optimizing the wiring design.

In other embodiments, the third anode reset voltage is smaller than the first gate reset voltage, and the fourth anode reset voltage is smaller than the second gate reset voltage. With such configuration, compared with the reset voltage of the gate of the driving transistor M0, the reset voltage of the anode of the light-emitting element D is lower, so that a lower voltage can be used to initialize the anode of the light-emitting element D, and the voltage difference between the anode and the cathode of the light-emitting element D can be reduced, thereby reducing undesired light-emitting of the light-emitting element D. The reset voltage of the gate of the driving transistor M0 is slightly higher, which can avoid pulling the potential of the gate of the driving transistor M0 too low during resetting the driving transistor M0. In this way, when the gate driving transistor M0 is charged later, the data voltage can be written under a slightly higher potential, which reduces the risk of insufficient charging.

Figure 19:
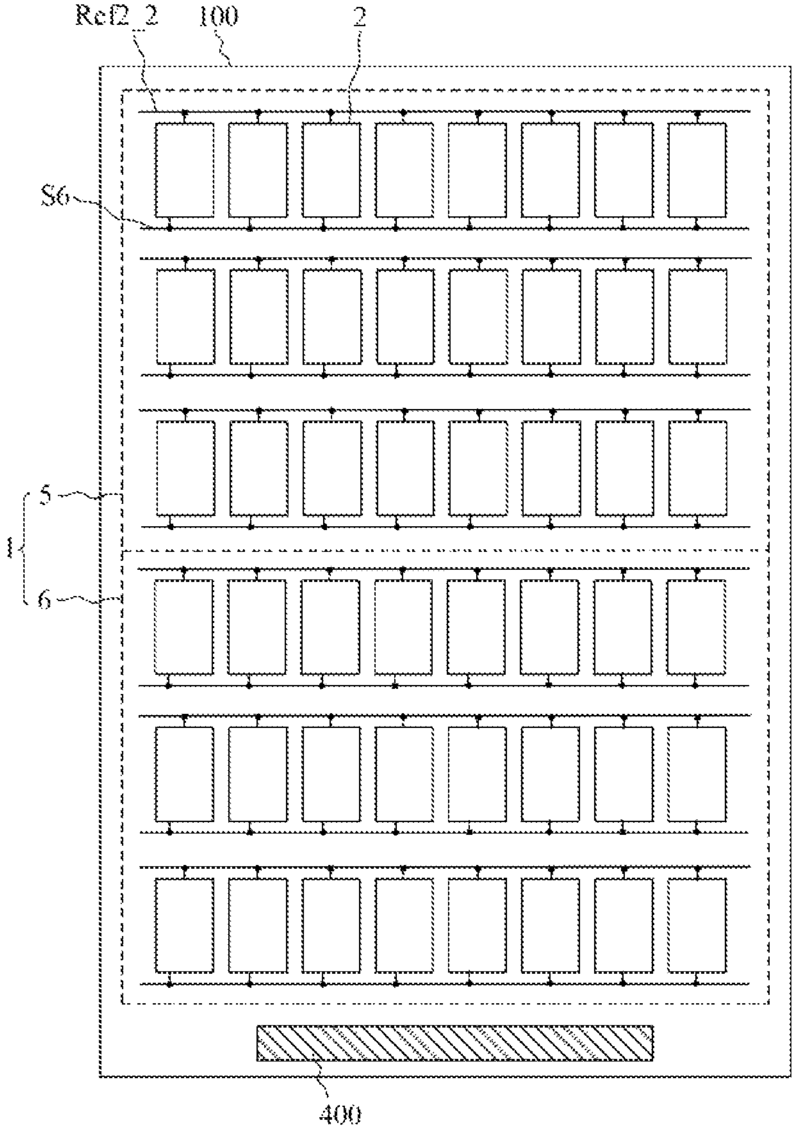
FIG. 19 is another top view of a display device according to some embodiments of the present disclosure.

FIG. 19 is another top view of a display device according to some embodiments of the present disclosure. In some embodiments, as shown in FIG. 19, the display device also includes a third driving module 400, and the third driving module 400 can be a processor in the driver chip.

The third driving module 400 is configured to: when the display panel 100 displays an image, control the pixel circuit 2 in the first sub-area 5 of the display area 1 to perform data refreshing at the first frequency, control the sixth scanning signal line S6 electrically connected to the pixel circuit 2 located in the first sub-area 5 to perform scanning at the first frequency, and control the second anode reset signal line Ref2_2 electrically connected to the pixel circuit 2 located in the first sub-area 5 to provide a third anode reset voltage; and control the pixel circuit 2 in the second sub-area 6 of the display area 1 to perform data refreshing at the second frequency, control the sixth scanning signal line S6 electrically connected to the pixel circuit 2 located in the second sub-area 6 to perform scanning at the third frequency, and control the second anode reset signal line Ref2_2 electrically connected to the pixel circuit 2 located in the second sub-area 6 to provide a fourth anode reset voltage.

As described above, since the embodiments of the present disclosure can reduce the brightness during the holding period HF, and then the difference between the brightness during the high-frequency writing period WF_H and the brightness during the holding period HF is reduced, so that the difference between the brightness during the high-frequency writing period WF_H and the brightness during the holding period HF can be reduced when the display panel 100 drives different sub-areas at different frequencies, and then difference between the overall display brightness in the first sub-area 5 and the overall display brightness in the second sub-area 6 can be improved, thereby improving the display uniformity of the display panel 100.

When the display panel 100 displays different images, the position of the first sub-area 5 and the position of the second sub-area 6 can be fixed. In this case, the sixth scanning signal line S6 electrically connected to the pixel circuit 2 located in the first sub-area 5 and the sixth scanning signal line S6 electrically connected to the pixel circuit 2 located in the second sub-area 6 can be electrically connected to different shift registers and are driven by the shift registers independently. The second anode reset signal line Ref2_2 electrically connected to the pixel circuit 2 located in the first sub-area 5 and the second anode reset signal line Ref2_2 electrically connected to the pixel circuit 2 located in the second sub-area 6 can also be electrically connected to a different second anode reset buses, respectively, to receive voltages provided by different second anode reset buses.

When the display panel displays different images, the position of the first sub-area 5 and the position of the second sub-area 6 can be not fixed. In this case, the sixth scanning signal line S6 electrically connected to the pixel circuit 2 located in the first sub-area 5 and the sixth scanning signal line S6 electrically connected to the pixel circuit 2 located in the second sub-area 6 can be electrically connected to a same shift register, and the second anode reset signal line Ref2_2 electrically connected to the pixel circuit 2 located in the first sub-area 5 and the second anode reset signal line Ref2_2 electrically connected to the pixel circuit 2 located in the second sub-area 6 can also be electrically connected to a same second anode reset bus. In this case, only when driving different areas, the frequency of the signal output by the shift register is controlled to jump, and the voltage output by the second anode reset bus is controlled to jump.

In some embodiments, the third frequency is equal to the first frequency.

When the third frequency is equal to the first frequency, within each holding period HF in the low-frequency driving mode, all sixth scanning signal lines S6 will drive the second anode reset modules 20 to resets the anode of the light-emitting element D by using the fourth anode reset voltage $V_{ref2\_2'}$, to pull its initial voltage to a lower voltage, thereby slowing down the charging speed of the light-emitting element D in each holding period HF, reducing the light-emitting brightness in each holding period HF, and improving the screen flicker phenomenon to a greater extent or improving the uniformity of the display to a greater extent.

In some embodiments, before the light-emitting element D emits light during each holding period, the anode of the light-emitting element D is initialized, and the uniformity of the potentials of the anodes of the light-emitting elements D within each holding period HF can also be improved, and then the charging uniformity during different holding periods HF can be guaranteed when the anode of the light-emitting element D is charged, thereby improving the light-emitting uniformity during different holding periods HF.

In some embodiments, in conjunction with FIG. 3 and FIG. 18, the pixel circuit 2 also includes a data writing module 7, the data writing module 7 is electrically connected to the third scanning signal line S3, the data line Data, and the first electrode of the driving transistor M0. The third scanning signal line S3 is reused as the sixth scanning signal line S6.

When the pixel circuit 2 performs data refreshing at the second frequency, the driving cycle of the pixel circuit 2 includes a low-frequency writing period WF_L and a holding period HF, and the data line Data is configured to provide the data voltage during the low-frequency writing period WF_L, and to provide a bias voltage during the holding period HF.

In this configuration, the third scanning signal line S3 is reused as the sixth scanning signal line S6, that is, the third scanning signal can also perform scanning at the third frequency, which can reduce the number of the scanning signal lines in the pixel circuit 2, thereby optimizing wiring. In some embodiments, in at least one holding period HF, when the third scanning signal line S3 provides an enable level to control the second anode reset module 20 to reset the anode of the light-emitting element D, the data writing module 7 is turned on in response to the enable level provided by the third scanning signal line S3. In this case, the data line Data is configured to provide the bias voltage during the holding period HF, and the bias voltage can be used to adjust the bias state of the driving transistor M0, to reduce the driving current of the driving transistor M0 during the holding period HF, thereby reducing the brightness during the holding period HF and weakening the difference between the brightness during the holding period HF and the brightness during the high-frequency writing period WF_H.

In one some embodiments, the second anode reset module 20 includes a second anode reset transistor M4, and the second anode reset transistor M4 includes a gate electrically connected to the sixth scanning signal line S6, a first electrode electrically connected to the second anode reset signal line Ref2_2, and a second electrode electrically connected to the anode of the light-emitting element D.

The second anode reset transistor M4 is turned on under the enable level provided by the sixth scanning signal line S6, and is configured to write the third anode reset voltage or the fourth anode reset voltage provided by the second anode reset signal line Ref2_2 to the anode of the light-emitting element D to reset the anode of the light-emitting element D.

Some embodiments of the present disclosure describe the operating process of the pixel circuit 2 in detail by taking the pixel circuits shown in FIG. 3, FIG. 10, FIG. 12, and FIG. 15 as examples.

In a first circuit structure, referring to FIG. 3, the pixel circuit 2 includes a driving transistor M0, a voltage regulating module 3, a second anode reset module 20, a data writing module 7, a threshold compensation module 8, a first light-emitting control module 17, a second light-emitting control module 18, and a storage capacitor $C_{st}$, and the voltage regulating module 3 includes a gate reset module 15.

The gate reset module 15 includes a gate reset transistor M1, and the gate reset transistor M1 includes a gate electrically connected to the first scanning signal line S1, a first electrode electrically connected to the gate reset signal line Ref1, and a second electrode electrically connected to the gate of the driving transistor M0.

The second anode reset module 20 includes a second anode reset transistor M4, and the second anode reset transistor M4 includes a gate electrically connected to the sixth scanning signal line S6, a first electrode electrically connected to the second anode reset signal line Ref2_2, and a second electrode electrically connected to the anode of the light-emitting element D.

The data writing module 7 includes a data writing transistor M5, and the data writing transistor M5 includes a gate electrically connected to the third scanning signal line S3, a first electrode electrically connected to the data line Data, and a second electrode electrically connected to the first electrode of the driving transistor M0.

The threshold compensation module 8 includes a threshold compensation transistor M6, and the threshold compensation transistor M6 includes a gate electrically connected to the fourth scanning signal line S4, a first electrode electrically connected to the second electrode of the driving transistor M0, and a second electrode electrically connected to the gate of the driving transistor M0.

The first light-emitting control module 17 includes a first light-emitting control transistor M7, and the first light-emitting control transistor M7 includes a gate electrically connected to a first light-emitting control signal line EM1, a first electrode electrically connected to the second electrode of the driving transistor M0, and a second electrode electrically connected to the anode of the light-emitting element D.

The second light-emitting control module 18 includes a second light-emitting control transistor M8, and the second light-emitting control transistor M8 includes a gate electrically connected to a second light-emitting control signal line EM2, a first electrode electrically connected to the power signal line PVDD, and a second electrode electrically connected to the first electrode of the driving transistor M0.

The storage capacitor $C_{st}$ includes a first electrode plate electrically connected to the power signal line PVDD, and a second electrode plate electrically connected to the gate of the driving transistor M0.

In order to reduce the effect of a leakage current on the potential of the gate of the driving transistor M0, the gate reset transistor M1 and the threshold compensation transistor M6 can be an N-type indium gallium zinc oxide (IGZO) transistor, and the driving transistor M0, the data writing transistor M5, the second anode reset transistor M4, the first light-emitting control transistor M7, and the second light-emitting control transistor M8 can be P-type low-temperature poly-silicon (LTPS) transistor.

Based on the above circuit structure, combined with the timing sequence shown in FIG. 8, the high-frequency writing period WF_H and the low-frequency writing period WF_L each include a reset sub-period t1, a charging sub-period t2, and a light-emitting sub-period t3.

During the reset sub-period t1, the first scanning signal line S1 provides a high level, the gate reset transistor M1 writes the first gate reset voltage Vref1 or the second gate reset voltage Vref1' provided by the gate reset signal line to the gate driving transistor M0 to reset the gate of the driving transistor M0, and at this time, the voltage $V_{g1}$ of the gate of the driving transistor M0 satisfies: $V_{g1}=V_{ref1}$ or $V_{g1}=V_{ref1'}$.

During the charging sub-period t2, the third scanning signal line S3 provides a low level, the fourth scanning signal line S4 provides a high level, the sixth scanning signal line S6 provides a low level, the data writing transistor M5 writes the data voltage $V_{Data}$ provided by the data line Data to the first electrode of the driving transistor M0, the threshold compensation transistor M6 writes the data voltage $V_{Data}$ to the gate of the driving transistor M0 and compensates the threshold of the driving transistor M0, and at this time, the voltage of the gate of the driving transistor M0 is $V_{g2}$, $V_{g2}=V_{Data}+V_{th}$. At the same time, the second anode reset module 20 is configured to write the third anode reset voltage provided $V_{ref2\_1}$ or the fourth anode reset voltage $V_{ref2\_1'}$ provided by the second anode reset signal line Ref2_2 to the anode of the light-emitting element D, to reset the anode of the light-emitting element D, and at this time, the voltage $V_o$ of the anode of the light-emitting element D satisfies: $V_o=V_{ref2\_1}$, or $V_o=V_{ref2\_1'}$.

During the light-emitting sub-period t3, the first light-emitting control signal line EM1 provides a low level, the second light-emitting control signal line EM2 provides a low level, the second light-emitting control transistor M8 writes the power voltage $V_{PVDD}$ provided by the power signal line PVDD to the first electrode of the driving transistor M0, and the first light-emitting control transistor M7 transmits the driving currents converted by the driving transistor M0 according to the power voltage $V_{PVDD}$ and the data voltage $V_{Data}$ to the anode of the light-emitting element D, to drive the light-emitting element D to emit light.

Based on the above structure, in some embodiments of the present disclosure, the first gate reset voltage $V_{ref1}$ provided by the gate reset signal line when the pixel circuit 2 performs data refreshing at the first frequency, can be greater than the second gate reset voltage $V_{ref1'}$ provided by the gate reset signal line when the pixel circuit 2 performs data refreshing at the second frequency, to improve the brightness during the high-frequency writing period WF_H; and/or, the fourth anode reset voltage $V_{ref2\_1'}$ provided by the second anode reset signal line Ref2_2 when the pixel circuit 2 performs data refreshing at the second frequency, can be smaller than the third anode reset voltage $V_{ref2\_1}$ provided by the second anode reset signal line Ref2_2 when the pixel circuit 2 performs data refreshing at the first frequency, to reduce the brightness during the holding period HF.

In a second circuit structure, compared with the first circuit structure shown in FIG. 3, in the second circuit structure shown in FIG. 10, the voltage regulating module 3 in the pixel circuit 2 also includes a regulating module 16, the control module 16 includes a regulation transistor M2, and the regulation transistor M2 includes a gate electrically connected to the second scanning signal line S2, a first electrode electrically connected to the bias-voltage signal line DVH, and a second electrode electrically connected to the first electrode of the driving transistor M0. The regulation transistor M2 can be a P-type LTPS transistor.

Based on the above circuit structure, combined with the timing sequence shown in FIG. 11, the high-frequency writing period WF_H and the low-frequency writing period WF_L each include a reset sub-period t1, a charging sub-period t2, a bias-voltage regulating sub-period t4, and a light-emitting sub-period t3. The holding period HF includes the bias-voltage regulating sub-period t4, and the light-emitting sub-period t3. The operating principles of the pixel circuit 2 during the reset sub-period t1, the charging sub-period t2, and the light-emitting sub-period t3 are the same as the operating principles corresponding to the above circuit structure, and will not be repeated herein.

During the bias-voltage control sub-period t4, the second scanning signal line S2 provides a low level, and the regulation transistor M2 writes the first bias voltage $V_{DVH}$ or the second bias voltage $V_{DVH'}$ provided by the bias-voltage signal line DVH to the first electrode of the driving transistor M0, to adjust the bias state of the driving transistor M0.

Based on the above structure, in some embodiments of the present disclosure, the first gate reset voltage $V_{ref1}$ provided by the gate reset signal line when the pixel circuit 2 performs data refreshing at the first frequency, can be greater than the second gate reset voltage $V_{ref1'}$ provided by the gate reset signal line when the pixel circuit 2 performs data refreshing at the second frequency, to improve the brightness during the high-frequency writing period WF_H; and/or, a second bias voltage VDVH' provided by the bias-voltage signal line DVH when the pixel circuit 2 performs data refreshing at the second frequency, can be greater than the first bias voltage $V_{DVH}$ provided by the bias-voltage signal line DVH when the pixel circuit 2 performs data refreshing at the first frequency, to reduce the brightness during the holding period HF; and/or, the fourth anode reset voltage $V_{ref2\_1'}$ provided by the second anode reset signal line Ref2_2 when the pixel circuit 2 performs data refreshing at the second frequency, can be smaller than the third anode reset voltage $V_{ref2\_1}$ provided by the second anode reset signal line Ref2_2 when the pixel circuit 2 performs data refreshing at the first frequency, to reduce the brightness during the holding period HF.

In the first circuit structure schematically illustrated in FIG. 3 and the second circuit structure schematically illustrated in FIG. 10, the third scanning signal line S3 can be reused as the sixth scanning signal line S6, that is, the third scanning signal line S3 and the sixth scanning signal line S6 provide a same signal; and the first light-emitting control signal line EM1 can be reused as the second light-emitting control signal line EM2, that is, the first light-emitting control signal line EM1 and the second light-emitting control signal line EM2 provide a same signal.

In a third circuit structure, referring to FIG. 15, the pixel circuit 2 includes a driving transistor M0, a voltage regulating module 3, a data writing module 7, a threshold compensation module 8, a first light-emitting control module 17, a second light-emitting control module 18, and a storage capacitor $C_{st}$. The voltage regulating module 3 includes a first anode reset module 19.

The first anode reset module 19 includes a first anode reset transistor M3, and the first anode reset transistor M3 includes a gate electrically connected to the fifth scanning signal line S5, a first electrode electrically connected to the first anode reset signal line Ref2_1, and a second electrode electrically connected to the anode of the light-emitting element D.

The data writing module 7 includes a data writing transistor M5, and the data writing transistor M5 includes a gate electrically connected to the third scanning signal line S3, a first electrode electrically connected to the data line Data, and a second electrode electrically connected to the first electrode of the driving transistor M0.

The threshold compensation module 8 includes a threshold compensation transistor M6, and the threshold compensation transistor M6 includes a gate electrically connected to the fourth scanning signal line S4, a first electrode electrically connected to the second electrode of the driving transistor M0, and a second electrode electrically connected to the gate of the driving transistor M0.

The first light-emitting control module 17 includes a first light-emitting control transistor M7, and the first light-emitting control transistor M7 includes a gate electrically connected to a first light-emitting control signal line EM1, a first electrode electrically connected to the first electrode of the driving transistor M0, and a second electrode electrically connected to the anode of the light-emitting element D.

The second light-emitting control module 18 includes a second light-emitting control transistor M8, and the second light-emitting control transistor M8 includes a gate electrically connected to a second light-emitting control signal line EM2, a first electrode electrically connected to the power signal line PVDD, and a second electrode electrically connected to the second electrode of the driving transistor M0.

The storage capacitor $C_{st}$ includes a first electrode plate electrically connected to the gate of the driving transistor M0, and a second electrode plate electrically connected to the anode of the light-emitting element D.

The driving transistor M0, the first anode reset transistor M3, the data writing transistor M5, the first light-emitting control transistor M7, and the second light-emitting control transistor M8 can all be N-type IGZO transistors.

Based on the above circuit structure, combined with the timing sequence shown in FIG. 16, the high-frequency writing period WF_H and the low-frequency writing period WF_L each include a reset sub-period t1', a charging sub-period t2', a modulation sub-period t3', and a light-emitting sub-period t4'.

During the reset sub-period t1', the fourth scanning signal line S4 provides a high level, the fifth scanning signal line S5 provides a high level, the second light-emitting control signal line EM2 provides a high level, the second light-emitting control transistor M8 writes the power voltage $V_{PVDD}$ provided by the power signal line PVDD to the first electrode of the driving transistor M0, and the threshold compensation transistor M6 writes the power voltage VPVDD to the gate of the driving transistor M0, thereby resetting the gate of the driving transistor M0. At this time, the voltage $V_{g1}$ of the gate of the driving transistor M0 satisfies: $V_{g1}=V_{PVDD}$. Meanwhile, the first anode reset transistor M3 writes the first anode reset voltage $V_{ref2\_1}$ or the second anode reset voltage $V_{ref2\_1'}$ provided by the first anode reset signal line Ref2_1 to the anode of the light-emitting element D, and in this case, the voltage $V_o$ of the anode of the light-emitting element D satisfies: $V_o=V_{ref2\_1}$, or $V_o=V_{ref2\_1'}$.

During the charging sub-period t2', the third scanning signal line S3 provides a high level, the fourth scanning signal line S4 provides a high level, the fifth scanning signal line S5 provides a high level, the data writing transistor M5 writes the data voltage V Data provided by the data line Data to the first electrode of the driving transistor M0, the threshold compensation transistor M6 writes the data voltage $V_{Data}$ to the gate of the driving transistor M0 and compensate the threshold of the driving transistor M0, and at this time, the voltage $V_{g2}$ of the gate of the driving transistor M0 satisfies: $V_{g1}=V_{Data}+V_{th}$. At the same time, the first anode reset module 19 continues to reset the anode of the light-emitting element D.

During the modulation sub-period t3', the third scanning signal line S3 provides a high level, the first light-emitting control signal line EM1 provides a high level, the data writing transistor M5 writes the data voltage $V_{Data}$ provided by the data line Data to the first electrode of the driving transistor M0, the first light-emitting control transistor M7 writes the data voltage $V_{Data}$ to the anode of the light-emitting element D, and at this time, the voltage of the anode of the light-emitting element D jumps to $V_{Data}$ from $V_{ref2\_1}$ or $V_{ref2\_1'}$, and the jumping voltage difference is $V_{Data}-V_{ref2\_1}$ or $V_{Data}-V_{ref2\_1'}$. Based on the function of the storage capacitor $C_{st}$, the potential of the gate of the driving transistor M0 will also change by $V_{Data}-V_{ref2\_1}$ or $V_{Data}-V_{ref2\_1'}$, and in this case, the potential $V_{g2}$ of the gate of the driving transistor satisfies: $V_{g2}-2V_{Data}+V_{th}-V_{ref2\_1}$, or $V_{g2}=2V_{Data}+V_{th}-V_{ref2\_1'}$.

During the light-emitting sub-period t4', the first light-emitting control signal line EM1 provides a high level, the second light-emitting control signal line EM2 provides a high level, the second light-emitting control transistor M8 writes the power voltage $V_{PVDD}$ provided by the power signal line PVDD to the second electrode of the driving transistor M0, and the first light-emitting control transistor M7 transmits the driving currents converted by the transistor M0 according to the power voltage $V_{PVDD}$ and the data voltage $V_{Data}$ to the anode of the light-emitting element D, to driving the light-emitting element D to emit light.

Based on the above structure, in some embodiments of the present disclosure, the second anode reset voltage $V_{ref2\_1'}$ provided by the first anode reset signal line Ref2_1 when the pixel circuit 2 performs data refreshing at the second frequency, can be smaller than the first anode reset voltage $V_{ref2\_1}$ provided by the first anode reset signal line Ref2_1 when the pixel circuit 2 performs data refreshing at the first frequency, to reduce the brightness during the holding period HF.

In a fourth circuit structure, compared with the first circuit structure shown in FIG. 15, in the fourth circuit structure shown in FIG. 12, the voltage regulating module 3 in the pixel circuit 2 also includes a regulating module 16, and the regulating module 16 includes a regulation transistor M2, and the regulation transistor M2 includes a gate electrically connected to the second scanning signal line S2, a first electrode electrically connected to the bias-voltage signal line DVH, and a second electrode electrically connected to the first electrode of the driving transistor M0. The regulation transistor M2 can be an N-type IGZO transistor.

Based on the above circuit structure, combined with the timing sequence shown in FIG. 13, the high-frequency writing period WF_H and the low-frequency writing period WF_L each include a reset sub-period t1', a charging sub-period t2', a modulation sub-period t3', a bias-voltage regulating sub-period t5', and a light-emitting sub-period t4'. The holding period HF includes the bias-voltage regulating sub-period t5' and the light-emitting sub-period t4'. The operating principles of the pixel circuit 2 during the reset sub-period t1', the charging sub-period t2', the modulation sub-period t3', and the light-emitting sub-period t4' are the same as the operating principles corresponding to the above circuit structure, and will not be repeated herein.

During the bias-voltage regulating sub-period t5', the first light-emitting control signal line EM1 provides a low level, the second scanning signal line S2 provides a high level, and the regulation transistor M2 writes the first bias voltage $V_{DVH}$ or the second bias voltage $V_{DVH'}$ provided by the bias-voltage signal line DVH to the first electrode of the driving transistor M0, to regulate the bias state of the driving transistor M0.

Based on the above structure, in some embodiments of the present disclosure, the second anode reset voltage $V_{ref2\_1'}$ provided by the first anode reset signal line Ref2_1 when the pixel circuit 2 performs data refreshing at the second frequency, can be smaller than the first anode reset voltage $V_{ref2\_1}$ provided by the first anode reset signal line Ref2_1 when the pixel circuit 2 performs data refreshing at the first frequency, to reduce the brightness during the holding period HF; and/or, the second bias voltage $V_{DVH'}$ provided by the bias-voltage signal line DVH when the pixel circuit 2 performs data refreshing at the second frequency, can be greater than the first bias voltage VDVH provided by bias the signal line DVH when the pixel circuit 2 performs data refreshing at the first frequency, to reduce the brightness during the holding period HF.

In the third circuit structure schematically illustrated by FIG. 15 and the fourth circuit structure schematically illustrated by FIG. 12, the fourth scanning signal line S4 can be reused as the fifth scanning signal line S5, that is, the fourth scanning signal line S4 and the fifth scanning signal line S5 provide a same signal.

Based on a same principle of the present disclosure, some embodiments of the present disclosure provide a method for driving the display panel 100. In conjunction with FIG. 2 and FIG. 3, the display panel 100 has a display area 1 and includes multiple pixel circuits 2 located in the display area 1, and the pixel circuit 2 includes a driving transistor M0 and a voltage regulating module 3. The voltage regulating module 3 is configured to adjust a node voltage of the driving transistor M0 using a voltage provided by a voltage regulating signal line 4.

The data refresh frequencies of the pixel circuits 2 include a first frequency and a second frequency, and the first frequency is greater than the second frequency.

Figure 20:
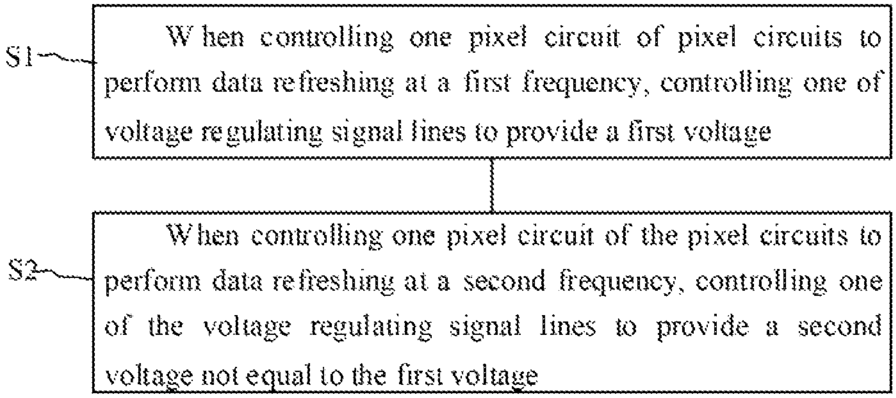
FIG. 20 is a flowchart of a method for driving a display panel according to some embodiments of the present disclosure.

FIG. 20 is a flowchart of a method for driving a display panel according to some embodiments of the present disclosure. As shown in FIG. 20, the method for driving the display panel includes step S1 and S2.

At step S1, when controlling the pixel circuit 2 to perform data refreshing at the first frequency, the control voltage regulating signal line 4 is controlled to provide a first voltage.

At step S2, when controlling the pixel circuit 2 to perform data refreshing at the second frequency, the control voltage regulating signal line 4 is controlled to provide a second voltage. The first voltage and the second voltage are not equal.

Based on the technical solution provided in the embodiments of the present disclosure, when the display panel 100 is driven at different frequencies, the voltages provided by the voltage regulating signal lines 4 are different, and the node voltage of the driving transistor M0 can be adjusted within periods corresponding to different driving frequencies, so that the driving transistor M0 is in a specific bias state. For example, by adjusting the first voltage or the second voltage, the bias state of the driving transistor M0 during the high-frequency writing period WF_H in the high-frequency driving mode can be adjusted to increase the driving current converted by the driving transistor M0, or the bias state of the driving transistor M0 during the holding period HF in the low-frequency driving mode can be adjusted to reduce the driving current converted by the driving transistor M0, thereby weakening the difference between the light-emitting brightness of the light-emitting element D during the high-frequency writing period WF_H and the light-emitting brightness of the light-emitting element D during the holding period HF.

In view of the above, in the display process of the display panel 100, when the display panel switches from the low-frequency driving mode to the high-frequency driving mode, flicker phenomenon generated when the display panel switches from the holding period HF in the low-frequency driving mode to the high-frequency writing period WF_H in the high frequency driving mode can be weakened. In other embodiments, when the display panel 100 controls different sub-areas at different frequencies, the difference between brightness in different sub-areas can be weakened, thereby improving the display uniformity, which more suitable for the medium-large-sized display products having a split screen display function.

In one some embodiments, in conjunction with FIG. 2, the display panel 100 has a first mode and a second mode.

When controlling the pixel circuit 2 to perform data refreshing at the first frequency, controlling the voltage regulating signal line 4 to provide the first voltage includes: in the first mode, controlling the pixel circuit 2 in the display area 1 to perform data refreshing at the first frequency, and controlling the voltage regulating signal line 4 electrically connected to the pixel circuit 2 located in the display area 1 to provide the first voltage.

When controlling the pixel circuit 2 to perform data refreshing at the second frequency, controlling the voltage regulating signal line 4 to provide the second voltage includes: in the second mode, controlling the pixel circuit 2 in the display area 1 to perform data refreshing at the second frequency, and controlling the voltage regulating signal line 4 electrically connected to the pixel circuit 2 located in the display area 1 to provide the second voltage.

When the display panel 100 has different display modes, in the embodiments of the present disclosure, the voltage regulating signal line 4 provides different voltages in different display modes, and the bias states of the driving transistor M0 in a particular periods in different display modes can be adjusted to different degrees, thereby regulating the value of the driving current that can be converted by driving transistor M0 in different display modes. When the display panel 100 is switched from the second mode to the first mode, the flicker phenomenon can be improved when switching images (jumping from the holding period HF to the high-frequency writing period WF_H), thereby optimizing the display effect.

In a some embodiments, in conjunction with FIG. 4, when controlling the pixel circuit 2 to perform data refreshing at the first frequency, controlling the voltage regulating signal line 4 to provide the first voltage, and when controlling the pixel circuit 2 to perform data refreshing at the second frequency, controlling the voltage regulating signal line 4 to provide the second voltage, include: when the display panel 100 displays an image, controlling the pixel circuit 2 in the first sub-area 5 of the control display area 1 to perform data refreshing at the first frequency, controlling the voltage regulating signal line 4 electrically connected to the pixel circuit 2 located in the first sub-area 5 to provide the first voltage, controlling the pixel circuit 2 in the second sub-area 6 of the display area 1 to perform data refreshing at the second frequency, and controlling the voltage regulating signal line 4 electrically connected to the pixel circuit 2 located in the second sub-area 6 to provide the second voltage.

With such configuration, the display panel 100 drives different sub-areas at different frequencies, for example, the first sub-area 5 corresponds to a part of the display area 1 that is driven at a high frequency, and the second sub-area 6 corresponds to a part of the display area 1 that is driven at a low frequency.

In the embodiments of the present disclosure, the voltages provided by the voltage regulating signal lines 4 electrically connected to the pixel circuits 2 in the first sub-area 5 and the second sub-area 6 are different from each other, and the bias states of the driving transistors M0 in the first sub-area 5 and the second sub-area 6 in particular periods can be regulated to different degrees, thereby adjusting the values of the driving currents converted by the driving transistors M0 in the first sub-area 5 and the second sub-area 6. For example, the driving current converted by the transistor M0 in the first sub-area 5 can be increased to weaken the difference between the light-emitting brightness of the light-emitting element D during the high-frequency writing period WF_H corresponding to the first sub-area 5 and the light-emitting brightness of the light-emitting element D during the holding period HF corresponding to the second sub-area 6, and then the overall display brightness difference between the first sub-area 5 and the second sub-area 6 can be weakened during the display process, thereby improving the display uniformity of the display panel 100 and improving the split-screen phenomenon.

In a some embodiments, in conjunction with FIG. 4, when the display panel 100 displays different images, the position of the first sub-area 5 and the position of the second sub-area 6 are fixed, that is, regardless of what image the display panel 100 displays, the position of the first sub-area 5 and the position of the second sub-area 6 do not change, the first sub-area 5 is always driven at the high frequency, and the second sub-area 6 is always driven at the low frequency.

The above configuration is more suitable for the display device having a local area for displaying a specific screen, for example, in the medium-large-sized display device, the top corner of the display device always displays only time information such as a clock, so that the local area at the top corner can be set as the second sub-area 6, other area is set as the first sub-area 5. At this time, the second driving module 300, according to only the fixed position information of the first sub-area 5 and the fixed position information of the second sub-area 6, controls the refresh frequencies of the pixel circuits 2 in the first sub-area 5 and the second sub-area 6 to be different from each other, and controls the voltages provided by the voltage regulating signal lines 4 electrically connected to the pixel circuits 2 in the first sub-area 5 and the second sub-area 6 to be different from each other.

In some embodiments, in conjunction with FIG. 3 and FIG. 4, the pixel circuit 2 also includes a data writing module 7 and a threshold compensation module 8, the data writing module 7 is electrically connected to the third scanning signal line S3, the data line Data, and the first electrode of the driving transistor M0, and the threshold compensation module 8 is electrically connected to the fourth scanning signal line S4, the second electrode of the driving transistor M0, and the gate of the driving transistor M0.

The display panel 100 can also include a first shift register 9 and a second shift register 10, the first shift register 9 is electrically connected to the fourth scanning signal line S4 electrically connected to the pixel circuit 2 located in the first sub-area 5, and the second shift register 10 is electrically connected to the fourth scanning signal line S4 electrically connected the pixel circuit 2 located in the second sub-area 6.

The controlling the pixel circuit 2 in the first sub-area 5 of the display area 1 to perform data refreshing at the first frequency, and controlling the pixel circuit 2 in the second sub-area 6 of the display area 1 to perform data refreshing at the second frequency, include: controlling the first shift register 9 to output a fourth scanning signal to the fourth scanning signal line S4 electrically connected to the first shift register 9 at the first frequency, and controlling the second shift register 10 to output a fourth scanning signal to the fourth scanning signal line S4 electrically connected to the second shift register 10 at the second frequency.

When the position of the first sub-area 5 and the position of the second sub-area 6 are fixed, the fourth scanning signal line S4 corresponding to the pixel circuit 2 located in the first sub-area 5 and the fourth scanning signal line S4 corresponding to the pixel circuit 2 located in the second sub-area 6 can be driven separately by using two independent shift registers, and the first shift register 9 and the second shift register 10 merely operate independently when the display panel 100 displays the image, to output signal at different frequencies to control the data circuits in different sub-areas to perform data refreshing at different frequencies. Such driving mode can independently control the driving frequencies at which the two sub-areas are driven, and the driving frequencies will not interfere with each other, achieving simple and accurate control.

In some embodiments, in conjunction with FIG. 7, the display panel 100 displays different images, the position of the first sub-area 5 and the position of the second sub-area 6 are not fixed.

The method for driving the display panel can also include: according to content that is displayed by a to-be-displayed image of the display panel in different areas, dividing the display area 1 into a first sub-area 5 and a second sub-area 6, and generating position information of the first sub-area 5 and the position information of the second sub-area 6.

In the above driving mode, the display panel 100 displays different images, the position of the first sub-area 5 and the position information of the second sub-area 6 are set according to the specific content of the to-be-displayed image, at this time, the position of the first sub-area 5 and the position of the second sub-area 6 can be flexibly regulated according to the different displayed images, and the position of the first sub-area 5 and the position of the second sub-area 6 can be divided flexibly.

In some embodiments, in conjunction with FIG. 3 and FIG. 7, the pixel circuit 2 also includes a data writing module 7 and a threshold compensation module 8, the data writing module 7 is electrically connected to the third scanning signal line S3, the data line Data, and the first electrode of the driving transistor M0, and the threshold compensation module 8 is electrically connected to the fourth scanning signal line S4, the second electrode of the driving transistor M0, and the gate of the driving transistor M0.

The display panel 100 can also include a third shift register 13 electrically connected to the fourth scanning signal line S4.

The controlling the pixel circuit 2 in the first sub-area 5 of the display area 1 to perform data refreshing at the first frequency, and controlling the pixel circuit 2 in the second sub-area 6 of the display area 1 to perform the data refreshing at the second frequency includes: when driving the first sub-area 5, controlling the third shift register 13 to output, at the first frequency, the fourth scanning signal to the fourth scanning signal line S4 electrically connected to the pixel circuit 2 located in the first sub-area 5, when driving the second sub-area 6, controlling the third shift register 13 to output, at the second frequency, the fourth scanning signal to the fourth scanning signal line S4 electrically connected to the pixel circuit 2 located in the second sub-area 6.

In the above driving mode, the fourth scanning signal lines S4 in the whole display area 1 are all electrically connected to a same third shift register 13. The control unit 302 can control the third shift register 13 to output signals to the fourth scanning signal lines S4 in different sub-areas at different frequencies based on only the determined position information of the first sub-area 5 and the determined position information of the second sub-area 6, and then the pixel circuit 2 in different sub-areas can be controlled to perform data refreshing at different frequencies.

In one some embodiments, in conjunction with FIG. 3 and FIG. 8, the voltage regulating module 3 includes a gate reset module 15, the voltage regulating signal line 4 includes a gate reset signal line Ref1, and the gate reset module 15 is electrically connected to the first scanning signal line S1, the gate reset signal line Ref1, and a gate of the driving transistor M0.

When controlling the pixel circuit 2 to perform data refreshing at the first frequency, controlling the voltage regulating signal line 4 to provide the first voltage includes: when the pixel circuit 2 is controlled to perform data refreshing at the first frequency, controlling the first scanning signal line S1 to performs scanning at the first frequency, and controlling gate reset signal line to provide a first gate reset voltage.

When controlling the pixel circuit 2 to perform data refreshing at the second frequency, controlling the voltage regulating signal line 4 to provide the second voltage includes: when controlling the pixel circuit 2 to perform data refreshing at the second frequency, controlling the first scanning signal line S1 to perform scanning at the second frequency, and controlling the gate reset signal line to provide a second gate reset voltage. The first gate reset voltage is greater than the second gate reset voltage.

Combined with the above analysis, above configuration can improve the light-emitting brightness of the light-emitting element D during the high-frequency writing period WF_H, thereby reducing difference between the brightness during the high-frequency writing period WF_H and the brightness during the holding period HF, weakening the screen flicker phenomenon when the display panel 100 switches between the low frequency and the high frequency, and weaken the difference between the brightness in different sub-areas when the display panel 100 drives different sub-areas at different frequencies, thereby improving the display uniformity.

In some embodiments, in conjunction with FIG. 9, when controlling the pixel circuit 2 to perform data refreshing at the first frequency, controlling the first scanning signal line S1 to perform scanning at the first frequency, and controlling the gate reset signal line to provide the first gate reset voltage, and when controlling the pixel circuit 2 to perform data refreshing at the second frequency, controlling the first scanning signal line S1 to perform scanning at the second frequency, and controlling the gate reset signal line to provide the second gate reset voltage include:

i. when the display panel 100 displays an image, controlling the pixel circuit 2 in the first sub-area 5 of the display area 1 to perform data refreshing at the first frequency, controlling the first scanning signal line S1 electrically connected to the pixel circuit 2 located in the first sub-area 5 to perform scanning at the first frequency, and controlling the gate reset signal line electrically connected to the pixel circuit 2 located in the first sub-area 5 to provide the first gate reset voltage; and controlling the pixel circuit 2 in the second sub-area 6 of the display area 1 to perform data refreshing at the second frequency, controlling the first scanning signal line S1 electrically connected to the pixel circuit 2 located in the second sub-area 6 to perform scanning at the second frequency, and controlling the gate reset signal line electrically connected to the pixel circuit 2 located in the second sub-area 6 to provide the second gate reset voltage.

When the display panel 100 drives different sub-areas at different frequencies, the above configuration can improve the light-emitting brightness of the light-emitting element D during the high-frequency writing period corresponding to the first sub-area 5 WF_H, thereby weakening the overall display brightness difference between the first sub-area 5 and the second sub-area 6, improving the display uniformity of the display panel 100, and improving the split-screen phenomenon.

In some embodiments, in conjunction with FIG. 10 through FIG. 13, the voltage regulating module 3 includes a regulating module 16, the voltage regulating signal line 4 includes a bias-voltage signal line DVH, and the control module 16 is electrically connected to the second scanning signal line S2, the bias-voltage signal line DVH, and the first electrode of the driving transistor M0.

When controlling the pixel circuit 2 to perform data refreshing at the first frequency, control the voltage regulating signal line 4 to provide the first voltage includes: when controlling the pixel circuit 2 to performs data refreshing at the first frequency, controlling the second scanning signal line S2 to perform scanning at the first frequency, and controlling the bias-voltage signal line DVH to provide a first bias voltage.

When controlling the pixel circuit 2 to perform data refreshing at the second frequency, controlling the voltage regulating signal line 4 to provide the second voltage includes: when controlling the pixel circuit 2 to perform data refreshing at the second frequency, controlling the second scanning signal line S2 to perform scanning at the first frequency, and control the bias-voltage signal line DVH to provide a second bias voltage greater than the first bias voltage.

Combined with the above analysis, the above configuration can reduce the light-emitting brightness of the light-emitting element D during the holding period HF, thereby reducing the difference between the brightness during the holding period HF and the brightness during the high-frequency writing period WF_H, and improving the screen flicker phenomenon or improving the display uniformity. After reducing the brightness during the holding period HF, the difference between the brightness during the holding period HF and the brightness during the low-frequency writing period WF_L can also be reduced, and when the display panel 100 is driven at the low frequency, the flicker phenomenon generated when the display panel 100 switches from the low-frequency writing period WF_L to the holding period HF can also be reduced.

In some embodiments, in conjunction with FIG. 14, when controlling the pixel circuit 2 to perform data refreshing at the first frequency, control the second scanning signal line S2 to perform scanning at the first frequency and controlling the bias-voltage signal line DVH to provide the first bias voltage, and when controlling the pixel circuit 2 to perform data refreshing at the second frequency, controlling the second scanning signal line S2 to perform scanning at the first frequency and controlling the bias-voltage signal line DVH to provide the second bias voltage includes:

ii. when the display panel 100 displays an image, controlling the pixel circuit 2 in the first sub-area 5 of the display area 1 to perform data refreshing at the first frequency, controlling the second scanning signal line S2 electrically connected to the pixel circuit 2 located in the first sub-area 5 to perform scanning at the first frequency, and controlling the bias-voltage signal line DVH electrically connected to the pixel circuit 2 located in the first sub-area 5 to provide the first bias voltage; and controlling the pixel circuit 2 in the second sub-area 6 of the display area 1 to perform data refreshing at the second frequency, controlling the second scanning signal line S2 electrically connected to the pixel circuit 2 located in the second sub-area 6 to perform scanning at the second frequency, and controlling the bias-voltage signal line DVH electrically connected to the pixel circuit 2 located in the second sub-area 6 to provide the second bias voltage.

When the display panel 100 drives different sub-areas at different frequencies, the above configuration can reduce the brightness during the holding period HF, thereby reducing the difference between the brightness during the high-frequency writing period WF_H and the brightness during the holding period HF, improving the overall display brightness difference between the first sub-area 5 and the second sub-area 6, and thus improving the display uniformity of the display panel 100.

In some embodiments, in conjunction with FIG. 15 and FIG. 16, the voltage regulating module 3 includes a first anode reset module 19, the voltage regulating signal line 4 includes a first anode reset signal line Ref2_1, and the first anode reset module 19 is electrically connected to a fifth scanning signal line S5, the first anode reset signal line Ref2_1, and an anode of the light-emitting element D.

The pixel circuit 2 can also include a data writing module 7, a threshold compensation module 8, a first light-emitting control module 17, and a storage capacitor $C_{st}$. The data writing module 7 is electrically connected between the data line Data and the first electrode of the driving transistor M0. The threshold compensation module 8 is electrically connected between the second electrode of the driving transistor M0 and the gate of the driving transistor M0. The first light-emitting control module 17 is electrically connected between the first electrode of the driving transistor M0 and the anode of the light-emitting element D. The storage capacitor $C_{st}$ is electrically connected between the gate of the driving transistor M0 and the anode of the light-emitting element D.

When the pixel circuit 2 performs data refreshing at the first frequency, the driving cycle of the pixel circuit 2 includes a high-frequency writing period WF_H. When the pixel circuit 2 performs data refreshing at the second frequency, the driving cycle of the pixel circuit 2 includes a low-frequency writing period WF_L. The high-frequency writing period WF_H and the low-frequency writing period WF_L each include a reset sub-period, a charging sub-period, a modulation sub-period, and a light-emitting sub-period.

When the pixel circuit 2 performs data refreshing at the first frequency or the second frequency, the method for driving the display panel can also include: during the reset sub-period, writing, by the first anode reset module 19, the voltage provided by the first anode reset signal line Ref2_1 to the anode of the light-emitting element D; during the charging sub-period, writing, by the data writing module 7, the data voltage provided by the data line Data to the first electrode of the driving transistor M0, and writing, by the threshold compensation module 8, the data voltage to the gate of the driving transistor M0, and compensating, by the threshold compensation module 8, a threshold of the driving transistor M0; and during the modulation sub-period, writing, by the data writing module 7, the data voltage provided by the data line Data to the first electrode of the driving transistor M0, and writing, by the first light-emitting control module 17, the data voltage of the first electrode of the driving transistor M0 to the anode of the light-emitting element D.

When controlling the pixel circuit 2 to perform data refreshing at the first frequency, controlling the voltage regulating signal line 4 to provide the first voltage includes: when controlling the pixel circuit 2 to perform data refreshing at the first frequency, controlling the fifth scanning signal line S5 to perform scanning at the first frequency, and controlling the first anode reset signal line Ref2_1 to provide the first anode reset voltage.

When controlling pixel circuit 2 to perform data refreshing at the second frequency, controlling the voltage regulating signal line 4 to provide the second voltage includes: when controlling the control pixel circuit 2 to perform data refreshing at the second frequency, controlling the fifth scanning signal line S5 to perform scanning at the second frequency, and controlling the first anode reset signal line Ref2_1 to provide the second anode reset voltage. The first anode reset voltage is greater than the second anode reset voltage.

Combined with the above analysis, the above configuration can improve the light-emitting brightness of the light-emitting element D during the high-frequency writing period WF_H, which reduces the difference between the brightness during the high-frequency writing period WF_H and the brightness during the holding period HF, thereby weakening the screen flicker phenomenon when the display panel 100 switches between the low frequency and the high frequency, and reducing the difference between the brightness in different sub-areas when the display panel 100 drives different sub-areas at different frequencies, and then improving the display uniformity.

In some embodiments, when the pixel circuit 2 performs data refreshing at the first frequency, controlling the fifth scanning signal line S5 to perform scanning at the first frequency and controlling the first anode reset signal line Ref2_1 to provide the first anode reset voltage, and when controlling the pixel circuit 2 to perform data refreshing at the second frequency, controlling the fifth scanning signal line S5 to perform scanning at the second frequency and controlling the first anode reset signal line Ref2_1 to provide the second anode reset voltage include:

when the display panel 100 displays an image, controlling the pixel circuit 2 in the first sub-area 5 of the display area 1 to perform data refreshing at the first frequency, controlling the fifth scanning signal line S5 electrically connected to the pixel circuit 2 located in the first sub-area 5 to perform scanning at the first frequency, and controlling the first anode reset signal line Ref2_1 electrically connected to the pixel circuit 2 located in the first sub-area 5 to provide the first anode reset voltage; and controlling the pixel circuit 2 in the second sub-area 6 of the display area 1 to perform data refreshing at the second frequency, controlling the fifth scanning signal line S5 electrically connected to the pixel circuit 2 located in the second sub-area 6 to perform scanning at the second frequency, and controlling the first anode reset signal line Ref2_1 electrically connected to the pixel circuit 2 located in the second sub-area 6 to provide the second anode reset voltage.

When the display panel 100 drives different sub-areas at different frequencies, the above configuration can improve the light-emitting brightness of the light-emitting element D during the high-frequency writing period WF_H corresponding to the first sub-area 5, thereby weakening the overall display brightness difference between the first sub-area 5 and the second sub-area 6, improving the display uniformity of the display panel 100, and improving the split-screen phenomenon.

In some embodiments, in conjunction with FIG. 3 and FIG. 18, the pixel circuit 2 also includes a second anode reset module 20, and the second anode reset module 20 is electrically connected to the sixth scanning signal line S6, the second anode reset signal line Ref2_2, and the anode of the light-emitting element D.

When controlling the pixel circuit 2 to perform data refreshing at the first frequency, the method for driving the display panel can include: controlling the sixth scanning signal line S6 to perform scanning at the first frequency, and controlling the anode reset signal line to provide the first anode reset voltage.

When controlling the pixel circuit 2 to perform data refreshing at the second frequency, the method for driving the display panel can include: controlling the sixth scanning signal line S6 to perform scanning at the third frequency, and controlling the anode reset signal line to provide the second anode reset voltage. The third frequency is greater than the second frequency, and is smaller than or equal to the first frequency, and the first anode reset voltage is greater than the second anode reset voltage.

Combined with the above analysis, the above configuration can slow down the charging speed of the anode of the light-emitting element D during the holding period HF, so that the brightness of the light-emitting element D increases slowly, thereby reducing the light-emitting brightness of the light-emitting element D during the holding period HF. In this way, the difference between the brightness during the holding period HF and the brightness during the high-frequency writing period WF_H can be reduced, thereby improving the screen flicker phenomenon or improving the display uniformity.

After reducing the brightness during the holding period HF, the difference between the brightness during the holding period HF and the brightness during the low-frequency writing period WF_L can be reduced, and when the display panel 100 is driven at the low frequency, the flicker phenomenon generated when the display panel 100 enters the holding period HF from the low-frequency writing period WF_L can also be weakened.

In some embodiments, when controlling the pixel circuit 2 to perform data refreshing at the first frequency, controlling the sixth scanning signal line S6 to perform scanning at the first frequency and controlling the anode reset signal line to provide the first anode reset voltage, and when controlling the pixel circuit 2 to perform data refreshing at the second frequency, controlling the sixth scanning signal line S6 to perform scanning at the third frequency and controlling the anode reset signal line to provide the second anode reset voltage can also include:

when the display panel 100 displays an image, controlling the pixel circuit 2 in the first sub-area 5 of the display area 1 to perform data refreshing at the first frequency, controlling the sixth scanning signal line S6 electrically connected to the pixel circuit 2 located in the first sub-area 5 to perform scanning at the first frequency, and controlling the anode reset signal line electrically connected to the pixel circuit 2 located in the first sub-area 5 to provide the first anode reset voltage; and controlling the pixel circuit 2 in the second sub-area 6 of the display area 1 to perform data refreshing at the second frequency, controlling the sixth scanning signal line S6 electrically connected to the pixel circuit 2 located in the second sub-area 6 to perform scanning at the third frequency, and controlling the anode reset signal line electrically connected to the pixel circuit 2 located in the second sub-area 6 to provide the second anode reset voltage.

When the display panel 100 drives different sub-areas at different frequencies, the above configuration can reduce the brightness during the holding period HF, which reduces the difference between the brightness during the high-frequency writing period WF_H and the brightness during the holding period HF, thereby the difference between the brightness during the high-frequency writing period WF_H and the brightness during the holding period HF, improving the overall display brightness difference between the first sub-area 5 and the second sub-area 6, and improving the display uniformity of the display panel 100.

The above embodiments are merely some embodiments of the present disclosure and are not intended to limit the present disclosure. Any modifications, equivalent substitutions and improvements made within the principle of the present disclosure shall fall into the protection scope of the present disclosure.

Finally, it should be noted that: the above embodiments are only used to illustrate, rather than to limit, the technical solution of the present disclosure. Although the present disclosure has been described in detail with reference to the foregoing embodiments, those of ordinary skill in the art shall understand that it can still modify the technical solutions described in the foregoing embodiments, or replace some or all of the technical features thereof. These modifications or replacements do not make the essence of the corresponding technical solution deviate from the scope of the technical solutions of all embodiments of the present disclosure.

What is claimed is:

1. A display device, comprising:

a display panel having a display area, wherein the display panel comprises a plurality of pixel circuits arranged in the display area, wherein each of the pixel circuits of the plurality of pixel circuits comprises a driving transistor and a voltage regulating module, wherein the voltage regulating module is electrically connected to a voltage regulating signal line, wherein the voltage regulating signal line provides voltage to at least one node connected to the driving transistor through the voltage regulating module;

wherein the plurality of pixel circuits has data refresh frequencies, wherein the data refresh frequencies comprise a first frequency and a second frequency, wherein the first frequency is greater than the second frequency; and wherein when one pixel circuit of the plurality of pixel circuits performs data refreshing at the first frequency, one corresponding voltage regulating signal line of a plurality of voltage regulating signal lines is configured to provide a first voltage, and, when one pixel circuit of the pixel circuits performs data refreshing at the second frequency, one corresponding voltage regulating signal line of the voltage regulating signal lines is configured to provide a second voltage, wherein the first voltage is not equal to the second voltage.

2. The display device according to claim 1, wherein the display panel has a first mode and a second mode; and the display device further comprises a first driving module, wherein, the plurality of pixel circuits in the display area are configured to perform data refreshing at the first frequency, and the plurality of voltage regulating signal lines are electrically connected to the plurality of pixel circuits in the display area to provide the first voltage in the first mode; and the plurality of pixel circuits in the display area are configured to perform data refreshing at the second frequency and the plurality of voltage regulating signal lines are electrically connected to the plurality of pixel circuits in the display area to provide the second voltage in the second mode.

3. The display device according to claim 1, wherein when the display panel displays an image, and wherein at least one pixel circuit of the plurality of pixel circuits that is located in a first sub-area of the display area is configured to perform data refreshing at the first frequency, and wherein at least one voltage regulating signal line of the plurality of voltage regulating signal lines is electrically connected to the at least one pixel circuit located in the first sub-area, wherein the at least one voltage regulating signal line is configured to provide the first voltage, and wherein at least one pixel circuit of the plurality of pixel circuits that is located in a second sub-area of the display area is configured to perform data refreshing at the second frequency, and at least one voltage regulating signal line of the plurality of voltage regulating signal lines electrically connected to the at least one pixel circuit of the plurality of pixel circuits located in the second sub-area, wherein the at least one voltage regulating signal is configured to provide the second voltage.

4. The display device according to claim 3, wherein when the display panel displays different images, and a position of the first sub-area and a position of the second sub-area are fixed.

5. The display device according to claim 4, wherein each pixel circuit of the plurality of pixel circuits further comprise a data writing module and a threshold compensation module, wherein the data writing module is electrically connected to a third scanning signal line, a first electrode of the driving transistor, and a data line;

wherein the threshold compensation module is electrically connected to a second electrode and a gate of the driving transistor and one of fourth scanning signal lines;

wherein the display panel further comprises a first shift register and a second shift register, wherein the first shift register is electrically connected to at least one fourth scanning signal line of the fourth scanning signal lines that is electrically connected to the at least one pixel circuit located in the first sub-area; and the second shift register is electrically connected to at least one fourth scanning signal line of the fourth scanning signal lines that is electrically connected to the at least one pixel circuit located in the second sub-area; and wherein when the display panel displays different images the first shift register is configured to output, at the first frequency, a fourth scanning signal to the at least one fourth scanning signal line electrically connected to the first shift register, and the second shift register is configured to output, at the second frequency, a fourth scanning signal to the at least one fourth scanning signal line electrically connected to the second shift register.

6. The display device according to claim 4, wherein the display panel further comprises a first voltage bus and a second voltage bus, wherein the first voltage bus is electrically connected to the at least one voltage regulating signal line of the plurality of the voltage regulating signal line electrically connected to the at least one pixel circuit of the plurality of pixel circuits located in the first sub-area and is configured to provide the first voltage; and the second voltage bus is electrically connected to the at least one voltage regulating signal line electrically connected to the at least one pixel circuit of the plurality of pixel circuits located in the second sub-area and is configured to provide the second voltage.

7. The display device according to claim 5, wherein:

the first sub-area and the second sub-area are arranged along a first direction; or the first sub-area surrounds the second sub-area and overlaps with the second sub-area in a second direction, and wherein the second direction is a direction along which each of the fourth scanning signal lines extends, and the first direction intersects the second direction.

8. The display device according to claim 3, wherein when the display panel displays different images, a position of the first sub-area and a position of the second sub-area are not fixed.

9. The display device according to claim 8, wherein each of the pixel circuits further comprises a data writing module and a threshold compensation module, wherein the data writing module is electrically connected to a third scanning signal line, a data line, and a first electrode of the driving transistor, and the threshold compensation module is electrically connected to a second electrode and a gate of the driving transistor and one of fourth scanning signal lines;

wherein the display panel further comprises a third shift register electrically connected to the fourth scanning signal lines; and wherein when the at least one pixel circuit of the plurality of pixel circuits located in the first sub-area performs data refreshing, and the third shift register is configured to output, at the first frequency, a fourth scanning signal to at least one fourth scanning signal line of the fourth scanning signal lines that is electrically connected to the at least one pixel circuit located in the first sub-area;

and when the at least one pixel circuit of the plurality of pixel circuits located in the second sub-area performs data refreshing, the third shift register is configured to output, at the second frequency, a fourth scanning signal to at least one fourth scanning signal line of the fourth scanning signal lines that is electrically connected to the at least one pixel circuit located in the second sub-area.

10. The display device according to claim 9, wherein the third shift register is electrically connected to a clock signal line; and when the at least one pixel circuit of the plurality of pixel circuits located in the first sub-area performs data refreshing, the clock signal line is configured to output, at the first frequency, a clock signal to the third shift register, and when the at least one pixel circuit of the plurality of pixel circuits located in the second sub-area performs data refreshing, the clock signal line is configured to output, at the second frequency, the clock signal to the third shift register.

11. The display device according to claim 8, wherein the display panel further comprises a third voltage bus electrically connected to the voltage regulating signal lines; and when the at least one pixel circuit of the plurality of pixel circuits located in the first sub-area performs data refreshing, the third voltage bus is configured to output of the first voltage, and when the at least one pixel circuit of the plurality of pixel circuits located in the second sub-area performs data refreshing, the third voltage bus is configured to output the second voltage.

12. The display device according to claim 1, wherein the voltage regulating module comprises a gate reset module, the plurality of voltage regulating signal lines comprise gate reset signal lines, and the gate reset module is electrically connected to a gate of the driving transistor, one of first scanning signal lines, and one of the gate reset signal lines;

when one pixel circuit of the plurality of pixel circuits performs data refreshing at the first frequency, one of the first scanning signal lines performs scanning at the first frequency, and one of the gate reset signal lines provides a first gate reset voltage; and when one pixel circuit of the plurality of pixel circuits performs data refreshing at the second frequency, one of the first scanning signal lines performs scanning at the second frequency, and one of the gate reset signal lines provides a second gate reset voltage, wherein the first gate reset voltage is greater than the second gate reset voltage.

13. The display device according to claim 12, wherein the display panel has a third mode and a fourth mode, wherein, in the third mode, $f1/f2=n$, where f1 denotes the first frequency, f2 denotes the second frequency; and in the fourth mode, $f1/f2=m$, and $n>m$; and the first gate reset voltage provided by one first scanning signal line of the at least one first scanning signal line electrically connected to the at least one pixel circuit of the plurality of pixel circuits located in the first sub-area in the third mode is greater than the first gate reset voltage provided by the first scanning signal line in the fourth mode.

14. The display device according to claim 12, wherein the gate reset module comprises a gate reset transistor, wherein the gate reset transistor comprises a gate electrically connected to the one of the first scanning signal lines, a first electrode electrically connected to the one of the gate reset signal lines, and a second electrode electrically connected to the gate of the driving transistor.

15. The display device according to claim 1, wherein the voltage regulating module comprises a regulation module, the plurality of voltage regulating signal lines comprises bias-voltage signal lines, and the regulation module is electrically connected to one of the second scanning signal lines, one of the bias-voltage signal lines, and a first electrode of the driving transistor;

wherein when one of the pixel circuits of the plurality of pixel circuits performs data refreshing at the first frequency, one corresponding second scanning signal line of the second scanning signal lines performs scanning at the first frequency, and one corresponding bias-voltage signal line of the plurality of bias-voltage signal lines provides a first bias voltage; and wherein when one of the pixel circuits performs data refreshing at the second frequency, one corresponding second scanning signal line of the second scanning signal lines performs scanning at the first frequency, and one corresponding bias-voltage signal line of the bias-voltage signal lines provides a second bias voltage greater than the first bias voltage.

16. The display device according to claim 15, wherein the regulation module comprises a regulation transistor, wherein the regulation transistor comprises a gate electrically connected to one of the second scanning signal lines, a first electrode electrically connected to one of the bias-voltage signal lines, and a second electrode electrically connected to the first electrode of the driving transistor.

17. The display device according to claim 1, wherein the voltage regulating module comprises a first anode reset module, the voltage regulating signal lines comprises first anode reset signal lines, and the first anode reset module is electrically connected to one of fifth scanning signal lines, one of the first anode reset signal lines, and an anode of a light-emitting element;

each of the pixel circuits of the plurality of pixel circuits further comprises a data writing module, a threshold compensation module, a first light-emitting control module, and a storage capacitor, wherein the data writing module is electrically connected between a data line and a first electrode of the driving transistor; the threshold compensation module is electrically connected between a second electrode of the driving transistor and a gate of the driving transistor; the first light-emitting control module is electrically connected between the first electrode of the driving transistor and the anode of the light-emitting element; and the storage capacitor is electrically connected between the gate of the driving transistor and the anode of the light-emitting element;

wherein when one of the pixel circuits performs data refreshing at the first frequency, a driving cycle of the pixel circuit comprises a high-frequency writing period; and when one of the pixel circuits performs data refreshing at the second frequency, the driving cycle of the pixel circuit comprises a low-frequency writing period, wherein each of the high-frequency writing period and the low-frequency writing period comprises a reset sub-period, a charging sub-period, a modulation sub-period, and a light-emitting sub-period;

during the reset sub-period, the first anode reset module writes a voltage provided by the one of the first anode reset signal lines to the anode of the light-emitting element; during the charging sub-period, the data writing module writes a data voltage provided by the data line to the first electrode of the driving transistor, the threshold compensation module writes the data voltage to the gate of the driving transistor and compensates a threshold of the driving transistor; and during the modulation sub-period, the data writing module writes the data voltage provided by the data line to the first electrode of the driving transistor, and the first light-emitting control module writes the data voltage of the first electrode of the driving transistor to the anode of the light-emitting element;

when one of the pixel circuits performs data refreshing at the first frequency, one of the fifth scanning signal lines performs scanning at the first frequency, and one of the first anode reset signal lines provides a first anode reset voltage; and when one of the pixel circuits performs data refreshing at the second frequency, one of the fifth scanning signal lines performs scanning at the second frequency, and one of the first anode reset signal lines provides a second anode reset voltage, wherein the first anode reset voltage is greater than the second anode reset voltage.

18. The display device according to claim 17, wherein the first anode reset module comprises a first anode reset transistor, wherein the first anode reset transistor comprises a gate electrically connected to the one of the fifth scanning signal lines, a first electrode electrically connected to the one of the first anode reset signal lines, and a second electrode electrically connected to the anode of the light-emitting element.

19. The display device according to claim 1, wherein each of the pixel circuits further comprises a second anode reset module, wherein the second anode reset module is electrically connected to one of sixth scanning signal lines, one of second anode reset signal lines, and an anode of a light-emitting element;

when one of the pixel circuits performs data refreshing at the first frequency, one of the sixth scanning signal lines performs scanning at the first frequency, and one of the second anode reset signal lines provides a third anode reset voltage; and when one of the pixel circuits performs data refreshing at the second frequency, one of the sixth scanning signal lines performs scanning at a third frequency, and one of the second anode reset signal lines provides a fourth anode reset voltage, wherein the third frequency is greater than the second frequency and is smaller than or equal to the first frequency, and the third anode reset voltage is greater than the fourth anode reset voltage.

20. A method for driving a display panel, wherein the display panel has a display area and comprises pixel circuits arranged in the display area, wherein each of the pixel circuits comprises a driving transistor and a voltage regulating module, wherein the voltage regulating module is electrically connected to a voltage regulation signal line, and the voltage regulating signal line provides voltage to at least one node connected to the driving transistor through the voltage regulating module, and wherein the pixel circuits have data refresh frequencies, the data refresh frequencies comprising a first frequency and a second frequency, wherein the first frequency is greater than the second frequency; the method for driving the display panel comprising:

when controlling one pixel circuit of the pixel circuits to perform data refreshing at the first frequency, controlling one of the voltage regulating signal lines to provide a first voltage; and when controlling one pixel circuit of the pixel circuits to perform data refreshing at the second frequency, controlling one of the voltage regulating signal lines to provide a second voltage, wherein the first voltage is not equal to the second voltage.

* * * * *